(12) United States Patent
Kasai et al.

(10) Patent No.: US 12,545,970 B2
(45) Date of Patent: Feb. 10, 2026

(54) PRODUCTION METHOD OF PIG IRON

(71) Applicant: Kabushiki Kaisha Kobe Seiko Sho (Kobe Steel, Ltd.), Kobe (JP)

(72) Inventors: Akito Kasai, Kakogawa (JP); Masahiro Yakeya, Kakogawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 392 days.

(21) Appl. No.: 18/042,876

(22) PCT Filed: Sep. 29, 2020

(86) PCT No.: PCT/JP2020/036957
§ 371 (c)(1),
(2) Date: Feb. 24, 2023

(87) PCT Pub. No.: WO2022/049780
PCT Pub. Date: Mar. 10, 2022

(65) Prior Publication Data
US 2023/0313328 A1    Oct. 5, 2023

(30) Foreign Application Priority Data
Sep. 3, 2020   (JP) ................................ 2020-148356

(51) Int. Cl.
*C21B 5/00* (2006.01)
(52) U.S. Cl.
CPC .............. *C21B 5/001* (2013.01); *C21B 5/008* (2013.01); *C21B 2300/02* (2013.01)

(58) Field of Classification Search
CPC ...... C21B 5/001; C21B 5/008; C21B 2300/02; C21B 5/006; C21B 7/24; C21B 2300/04; C21B 5/003; C21B 5/007
(Continued)

(56) References Cited

U.S. PATENT DOCUMENTS

| | | |
|---|---|---|
| 5,127,940 A | 7/1992 | Sugiyama et al. |
| 2011/0023657 A1 | 2/2011 | Ibaraki et al. |

(Continued)

FOREIGN PATENT DOCUMENTS

| | | | | |
|---|---|---|---|---|
| CA | 1155665 A | * | 10/1983 | ............. C21B 5/008 |
| CA | 2180544 C | * | 9/2000 | ............... C21B 5/00 |

(Continued)

OTHER PUBLICATIONS

JP-2015199978-A Translation (Year: 2015).*
(Continued)

*Primary Examiner* — Danielle M. Carda
(74) *Attorney, Agent, or Firm* — Oblon, McClelland, Maier & Neustadt, L.L.P.

(57) ABSTRACT

A production method of pig iron using a blast furnace with a tuyere includes: charging a first layer containing an iron ore material and a second layer containing coke alternately in the blast furnace; and reducing and melting the iron ore material in the charged first layer while injecting an auxiliary reductant into the blast furnace by hot air blown from the tuyere, in which: an aggregate for letting through the hot air to a central portion of the blast furnace is blended into the first layer; and the aggregate contains a reduced iron molded product obtained through compression molding of reduced iron.

6 Claims, 22 Drawing Sheets

(58) Field of Classification Search
USPC .......................................................... 75/459
See application file for complete search history.

(56) References Cited

U.S. PATENT DOCUMENTS

2024/0167109 A1* 5/2024 Miyagawa .............. C21B 5/007
2024/0240274 A1* 7/2024 Kasai ........................ F27B 1/16

FOREIGN PATENT DOCUMENTS

| | | |
|---|---|---|
| EP | 1 641 945 A2 | 4/2006 |
| JP | 57-137402 A | 8/1982 |
| JP | 6-172829 A | 6/1994 |
| JP | 8-253801 A | 10/1996 |
| JP | 11-43710 A | 2/1999 |
| JP | 11-286705 A | 10/1999 |
| JP | 11-315308 A | 11/1999 |
| JP | 2000-336412 A | 12/2000 |
| JP | 4-47422 B2 | 2/2008 |
| JP | 2011-63835 A | 3/2011 |
| JP | 2015199978 A * | 11/2015 |
| JP | 2016-125085 A | 7/2016 |
| JP | 6-273983 B2 | 2/2018 |
| WO | WO 2004/101829 A2 | 11/2004 |

OTHER PUBLICATIONS

International Search Report and Written Opinion issued Nov. 17, 2020, in PCT/JP2020/036957, 5 pages.
Extended European Search Report Issued Jul. 5, 2023 in European Application 20952514.6, 11 pages.
Extended European Search Report issued Sep. 23, 2024 in European Patent Application No. 24180808.8, 13 pages.

* cited by examiner ically, the role as the spacer is played only by the coke. In the conventional blast furnace operation method, the charging position of the reduced iron is limited to the peripheral portion of the furnace. In addition, the amount of the coke used is only relatively reduced by the charging of the reduced iron. Therefore, in the conventional blast furnace operation method, only a limited decrease in the amount of the coke used is possible, and the recent demand for a decrease in the $CO_2$ emission may not be sufficiently met.

PRODUCTION METHOD OF PIG IRON

TECHNICAL FIELD

The present invention relates to a production method of pig iron.

BACKGROUND ART

A method of producing pig iron through charging a first layer containing an iron ore material and a second layer containing coke alternately in a blast furnace, and reducing and melting the iron ore material while injecting an auxiliary reductant into the blast furnace by hot air blown from a tuyere has been known. During this, the coke serves as a heat source for melting the iron ore material, a reducing agent for the iron ore material, a recarburizing agent for carburizing the molten iron to lower the melting point, and a spacer for ensuring gas permeability in the blast furnace. Due to the coke maintaining gas permeability, descent of the burden is stabilized, and in turn, stable operation of the blast furnace is enabled.

In operation of the blast furnace, it is desirable that the proportion of the coke is low in light of cost reduction. However, a decrease in the proportion of the coke leads to attenuation of the above-described roles played by the coke. For example, as a method of decreasing the proportion of the coke, in other words increasing the proportion of the iron ore material, a blast furnace operation method of limitedly charging reduced iron of a small grain size to a peripheral portion of the blast furnace has been proposed (see Japanese Unexamined Patent Application, Publication No. H11-315308). In the blast furnace operation method, it is reportedly possible to increase the filling rate of the raw material while maintaining the roles of the coke as the heat source, the reducing agent, the recarburizing agent, and the spacer in the central portion of the furnace, by charging the reduced iron requiring no reduction only to the peripheral portion of the furnace.

PRIOR ART DOCUMENTS

Patent Documents

Patent Document 1: Japanese Unexamined Patent Application, Publication No. H11-315308

SUMMARY OF THE INVENTION

Problems to be Solved by the Invention

In light of recent requirement of a decrease in $CO_2$ emission, a further decrease in the amount of coke used in the blast furnace operation is demanded. In the conventional blast furnace operation method, of the roles played by the coke, the roles as the heat source, the reducing agent, and the recarburizing agent may be substituted by an auxiliary reductant injected from a tuyere. On the other hand, the role as the spacer is played only by the coke. In the conventional blast furnace operation method, the charging position of the reduced iron is limited to the peripheral portion of the furnace. In addition, the amount of the coke used is only relatively reduced by the charging of the reduced iron. Therefore, in the conventional blast furnace operation method, only a limited decrease in the amount of the coke used is possible, and the recent demand for a decrease in the $CO_2$ emission may not be sufficiently met.

The present invention was made in view of the foregoing circumstances, and an objective thereof is to provide a production method of pig iron enabling a decrease in the amount of the coke used while maintaining stable operation of the blast furnace.

Means for Solving the Problems

A production method of pig iron using a blast furnace with a tuyere according to one aspect of the present invention includes: charging a first layer containing an iron ore material and a second layer containing coke alternately in the blast furnace; and reducing and melting the iron ore material in the charged first layer while injecting an auxiliary reductant into the blast furnace by hot air blown from the tuyere, in which: an aggregate for letting through the hot air to a central portion of the blast furnace is blended into the first layer; and the aggregate contains a reduced iron molded product obtained through compression molding of reduced iron.

In the production method of pig iron, the first layer containing the iron ore material contains, as an aggregate, a reduced iron molded product obtained through compression molding of reduced iron. Since the reduced iron molded product facilitates permeation of hot air during softening and fusing of the first layer in the melting step, the production method of pig iron can decrease the amount of the coke for ensuring gas permeability. Consequently, using the production method of pig iron enables a decrease in the amount of the coke used while maintaining stable operation of the blast furnace.

As used herein, the "central portion" of the blast furnace refers to a region at a distance of less than or equal to 0.2 R from the center, R being a radius of a furnace throat portion.

It is preferred that: a charged rate of the reduced iron molded product is greater than or equal to 100 kg per 1 ton of the pig iron; a ratio of an average grain size of the reduced iron molded product to an average grain size of the iron ore material is greater than or equal to 1.3; and a gas permeability resistance index of the reduced iron molded product after a tumbler rotation test is less than or equal to 0.1. Due to the charging amount of the reduced iron molded product being greater than or equal to the lower limit, the ratio of the average grain size of the reduced iron molded product being greater than or equal to the lower limit, and the gas permeability resistance index of the reduced iron molded product being no greater than the upper limit, permeation of the hot air to the central portion of the blast furnace can be ensured. Consequently, a decrease in the amount of the coke used is enabled.

As used herein, the "gas permeability resistance index after a tumbler rotation test" of the reduced iron molded product is calculated as follows. First, the tumbler rotation test is carried out pursuant to Iron Ores—Determination Of Tumble Strength (JIS-M8712:2000) to obtain a grain size distribution of the reduced iron molded product through screening. The grain size distribution is indicated with $d_i$ [cm] being a typical grain size (median) of mesh opening used for the screening, and $w_i$ being a weight fraction of the reduced iron molded product belonging to the typical grain size $d_i$. By using this grain size distribution, a harmonic mean diameter $D_p$ [cm] and a granularity composition index $I_{sp}$ are calculated by the following formula 1. Furthermore, by using a gravitational conversion factor $g_c$ [9.807 (g·cm)/(G·sec$^2$)], a gas permeability resistance index K is obtained by the following formula 1. Note that rotational conditions of a tumbler in the tumbler rotation test are 24±1 rpm and 600 times.

[Math. 1]

$D_p = 1/(\Sigma w_i/d_i)$ $I_{sp} = 100 \times \sqrt{I_s \times I_p}$ where $I_s = D_p^2 \times \Sigma w_i \times (1/d_i - 1/D_p)^2$ $I_p = 1/D_p^2 \times \Sigma w_i \times (d_i - D_p)^2$ $K = C \times (1.06^{I_{sp}^n})/(g_c \times D_p^{1.5})$     1 where n=0.47, C=0.55

It is preferred that basicity of the reduced iron molded product is greater than or equal to 0.9. By thus configuring the basicity of the reduced iron molded product to be greater than or equal to the lower limit, the contraction starting temperature of the reduced iron molded product is increased, whereby a contraction amount of the first layer is suppressed. Consequently, gas permeability in a cohesive zone is improved, whereby permeation of the hot air to the central portion of the blast furnace can be ensured. Consequently, a decrease in the amount of the coke used is enabled.

As used herein, the "basicity" refers to a ratio of a mass of CaO to a mass of $SiO_2$.

It is preferred that the reduced iron molded product contains aluminum oxide, and a content of the aluminum oxide in the reduced iron molded product is less than or equal to 1.5% by mass. The aluminum oxide increases slag viscosity and deteriorates drip characteristics of the slag. Consequently, by configuring the content of aluminum oxide in the reduced iron molded product to be less than or equal to the upper limit, an increase in the amount of the coke used can be inhibited.

It is preferred that a content of the reduced iron molded product in the first layer is less than or equal to 30% by mass. Since the reduced iron molded product is larger than the iron ore material and great in individual weight, when charged to the blast furnace together with the iron ore material, the reduced iron molded product is likely to be separated and segregated. By configuring the content of the reduced iron molded product to be less than or equal to the upper limit, the separation and segregation can be inhibited. Therefore, the reduced iron molded product is relatively uniformly present to the central portion of the blast furnace and exerts an aggregate effect in the cohesive zone, whereby permeation of the hot air to the central portion of the blast furnace can be ensured. Consequently, a decrease in the amount of the coke used is enabled.

It is preferred that the iron ore material contains iron ore pellet, of which a porosity resulting from large open pores having a pore size of greater than or equal to 4 μm is greater than or equal to 21%. Due to the iron ore material containing iron ore pellet, of which the porosity resulting from the large open pores having the pore size of greater than or equal to 4 μm is greater than or equal to 21%, a reduction percentage of the iron ore material can be increased, whereby the amount of the coke used can be further decreased.

As used herein, the "porosity resulting from large open pores having a pore size of greater than or equal to 4 μm" refers to a percentage of a volume of the large open pores having the pore size of greater than or equal to 4 μm with respect to an apparent volume of the iron ore pellet, the percentage being calculated by $\varepsilon_0 \times A_{+4}/A$ [%], in which $\varepsilon_0$ [%] is open porosity of the iron ore pellet measured by using a mercury pressure porosimeter (for example Auto-Pore III 9400 manufactured by Shimadzu Corporation), A [cm$^3$/g] is a total capacity of pores per unit weight of the iron ore pellet, and $A_{+4}$ [cm$^3$/g] is a total capacity of pores having a pore size of greater than or equal to 4 μm per unit weight of the iron ore pellet. Note that an open pore refers to a pore connected to the outside of the iron ore pellet, while a closed pore refers to a pore closed inside the iron ore pellet.

It is preferable to further provide a step of charging a mixture of the coke and the reduced iron molded product to the central portion of the blast furnace, in which: in the reduced iron molded product in the mixture, a proportion of the reduced iron molded product having a grain size of greater than or equal to 5 mm is greater than or equal to 90% by mass; and a content of the reduced iron molded product in the mixture is less than or equal to 75% by mass. The hot air that has reached the central portion of the blast furnace goes up in the central portion. By thus including the reduced iron molded product of a large grain size in the central portion with a content being less than or equal to the upper limit, the sensible heat can be effectively used without disturbing the flow of the hot air. Consequently, a further decrease in the amount of the coke used is enabled.

It is preferred to further provide a step of finely pulverizing powder derived from the reduced iron molded product and coal, in which fine powder obtained by the fine pulverizing step is included as the auxiliary reductant. A part of the reduced iron molded product is pulverized into powder due to a conveying process and the like. Such powder lowers gas permeability in the blast furnace, and is not appropriate for use in the first layer. In addition, the powder has a large specific surface area, and is thus re-oxidized into iron oxide. Injecting the auxiliary reductant containing the iron oxide from the tuyere enables improvement of gas permeability. Consequently, by finely pulverizing powder derived from the reduced iron molded product together with coal and using fine powder obtained by finely pulverizing the powder and the coal as the auxiliary reductant to be injected from the tuyere, the reduced iron molded product can be effectively used and gas permeability in the blast furnace can be improved.

Effects of the Invention

As explained in the foregoing, the production method of pig iron according to the present invention enables a decrease in the amount of the coke used while maintaining stable operation of the blast furnace.

DESCRIPTION OF EMBODIMENTS

Hereinafter, the production method of pig iron according to each embodiment of the present invention will be described.

First Embodiment

Figure 1:
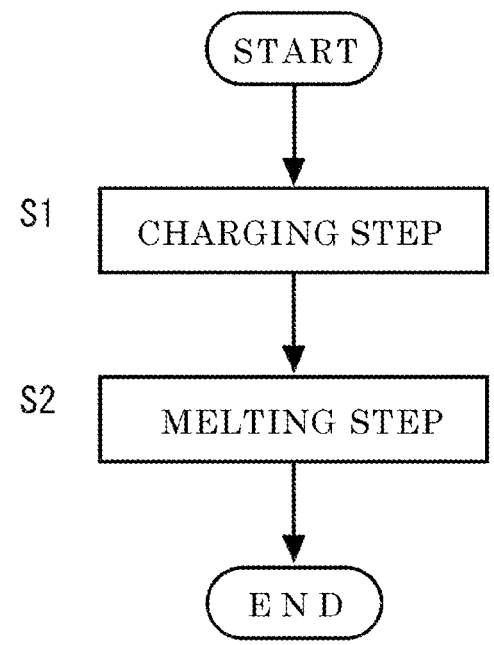
FIG. 1 is a flow diagram illustrating the production method of pig iron according to an embodiment of the present invention.
Figure 2:
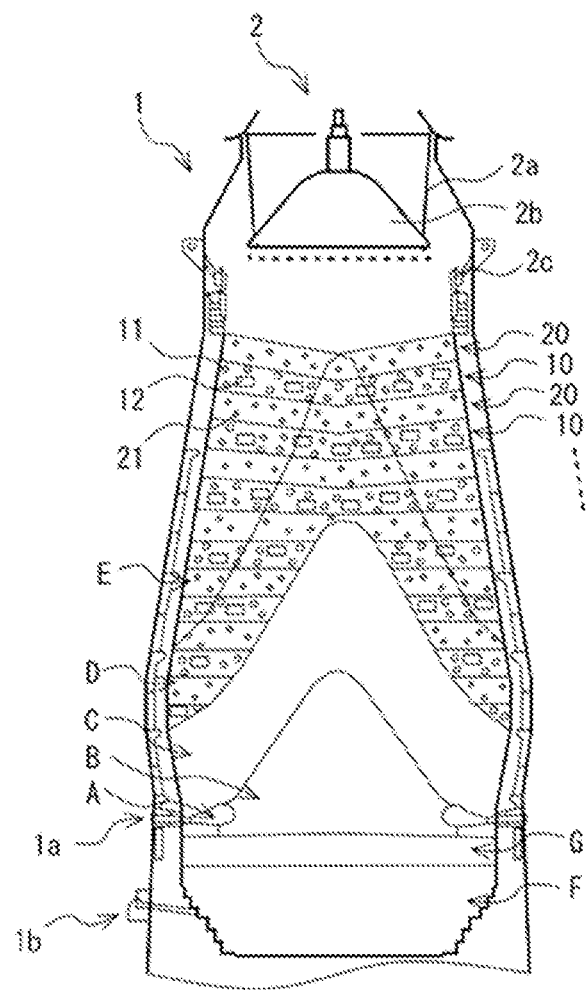
FIG. 2 is a schematic view illustrating the inside of the blast furnace used in the production method of pig iron in FIG. 1.

The production method of pig iron illustrated in FIG. 1 uses a blast furnace 1 illustrated in FIG. 2, and includes a charging step S1 and a melting step S2.

Blast Furnace

The blast furnace 1 includes a tuyere 1a and a taphole 1b provided in a furnace lower portion as illustrated in FIG. 2. Typically, a plurality of tuyeres 1a are provided. The blast furnace 1 is a solid-gas countercurrent type shaft furnace that enables: hot air, which is high-temperature air with high-temperature or normal-temperature oxygen being added as needed, to be blown from the tuyere 1a into the furnace; a series of reactions such as reduction and melting of an iron ore material 11 described later to take place; and pig iron to be tapped from the taphole 1b. In addition, the blast furnace 1 is equipped with a bell-armor type raw material charging device 2. The raw material charging device 2 will be described later.

Charging Step

In the charging step S1, a first layer 10 and a second layer 20 are alternately charged in the blast furnace 1 as illustrated in FIG. 2. In other words, the numbers of the first layers 10 and the second layers 20 are at least two, respectively.

(First Layer)

The first layer 10 contains the iron ore material 11. In addition, an aggregate 12 is blended into the first layer 10.

The iron ore material 11 refers to mineral ore serving as an iron raw material, and contains principally iron ore. The iron ore material 11 is exemplified by calcined iron ore (iron ore pellet, sintered iron ore), lump iron ore, carbon composite agglomerated iron ore, metal, and the like. In the melting step S2, the iron ore material 11 is heated and reduced into molten iron by the hot air blown from the tuyere 1a. Note that the reduced iron molded product contained in the aggregate 12 described later may also be an iron raw material; however, in the present specification, the iron ore material 11 does not include the reduced iron molded product.

In addition to the iron ore material 11, auxiliary materials such as limestone, dolomite, and silica may also be charged into the first layer 10.

The aggregate 12 is for improving gas permeability in a cohesive zone D described later, whereby the hot air is permeated to the central portion of the blast furnace 1. The aggregate 12 contains a reduced iron molded product (hot briquette iron: HBI) obtained through compression molding of reduced iron.

The HBI is obtained by molding direct reduced iron (DRI) in a hot state. The DRI is high in porosity and has a drawback of oxidization and heat generation during marine transportation and outdoor storage, while the HBI is low in porosity and not likely to be re-oxidized. After serving to ensure gas permeability in the first layer 10, the aggregate 12 functions as a metal and becomes molten iron. Since the aggregate 12 is high in metallization rate and requires no reduction, the reduction agent is not much required for becoming the molten iron. $CO_2$ emission can thus be reduced. Note that the "metallization rate" refers to a proportion [% by mass] of metallic iron with respect to the total iron content.

The lower limit of a charged rate of the reduced iron molded product is 100 kg and more preferably 150 kg per 1 ton of the pig iron. When the charged rate of the reduced iron molded product is less than the lower limit, the function of the aggregate 12 ensuring gas permeability in the cohesive zone D in the melting step S2 may not be sufficiently exerted. On the other hand, the upper limit of the charged rate of the reduced iron molded product is defined as appropriate in such a range that the aggregate is not excessive and does not diminish the effect of the aggregate, and is, for example, 700 kg per 1 ton of the pig iron.

Figure 3:
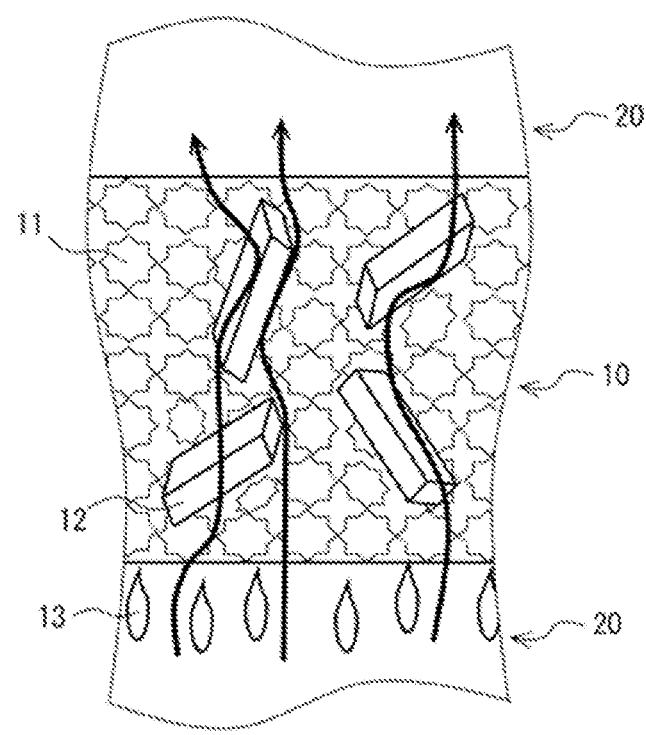
FIG. 3 is a schematic partial enlarged view of the vicinity of an area from a cohesive zone to a dripping zone in FIG. 2.

The lower limit of a ratio of an average grain size of the reduced iron molded product to an average grain size of the iron ore material 11 is 1.3, and more preferably 1.4. As illustrated in FIG. 3, even when a part of the iron ore material 11 in the first layer 10 is molten and moves to the lower side of the blast furnace 1 as a drip slag 13 and the iron ore material 11 is softened and shrunk, the reduced iron molded product having a high melting point is not softened. Blending the reduced iron molded product, which is larger than the iron ore material 11 to at least a certain degree, as the aggregate 12 facilitates the aggregate effect of the reduced iron molded product to be exerted and enables suppression of layer shrinkage of the entire first layer 10. Consequently, due to the ratio of the average grain sizes being greater than or equal to the lower limit, a channel of the hot air shown by an arrow in FIG. 3 can be secured, whereby gas permeability in the melting step S2 can be improved. Meanwhile, the upper limit of the average grain size is preferably 10 and more preferably 5. When the ratio of the average grain sizes is greater than the upper limit, it may be difficult to blend the reduced iron molded product uniformly into the first layer 10, leading to an increase in segregation.

The upper limit of a gas permeability resistance index of the reduced iron molded product after a tumbler rotation test is 0.1, and more preferably 0.08. The reduced iron molded product is typically produced and used in different plants, and subjected to transportation. If a reduced iron molded product that has been volume-broken and of which grain size distribution has been altered during the transportation is used, gas permeability in a lumpy zone E, described later, during the operation of the blast furnace may be lowered. To the contrary, by using the reduced iron molded product, which ensures that the gas permeability resistance index is less than or equal to a certain value even after the tumbler rotation test, the volume breakage can be suppressed, whereby gas permeability in the lumpy zone E can be ensured. On the other hand, the lower limit of the gas permeability resistance index is not particularly limited and may be a value close to zero, which is a theoretical limit value, but is typically about 0.03. Note that it is only required to use the reduced iron molded product having the gas permeability resistance index less than or equal to a predetermined value as a characteristic, and this does not mean that the tumbler rotation test is required in the production method of pig iron.

Note that, due to the charging amount of the reduced iron molded product being greater than or equal to the lower limit, the ratio of the average grain size of the reduced iron molded product being greater than or equal to the lower limit, and the gas permeability resistance index of the reduced iron molded product being less than or equal to the upper limit, gas permeability in the lumpy zone E and the cohesive zone D is improved, whereby permeation of the hot air to the central portion of the blast furnace 1 can be ensured. Consequently, a decrease in the amount of the coke used is enabled.

The lower limit of basicity of the reduced iron molded product is 0.9 and more preferably 1.0. By thus configuring the basicity of the reduced iron molded product to be greater than or equal to the lower limit, the contraction starting temperature of the reduced iron molded product is increased, whereby a contraction amount of the first layer 10 is suppressed. Consequently, gas permeability in the cohesive zone D is improved in the melting step S2, whereby permeation of the hot air to the central portion of the blast furnace 1 can be ensured. Consequently, a decrease in the amount of the coke used is enabled. On the other hand, the upper limit of the basicity of the reduced iron molded product is preferably 1.4 and more preferably 1.3. When the basicity of the reduced iron molded product is greater than the upper limit, strength of the reduced iron molded product may be lowered. Note that the basicity of the reduced iron molded product can be adjusted by adding an auxiliary material such as limestone during production of the reduced iron molded product.

In addition, the reduced iron molded product contains aluminum oxide. The upper limit of the content of the aluminum oxide in the reduced iron molded product is 1.5% by mass and more preferably 1.3% by mass. When the content of the aluminum oxide is greater than the upper limit, it may be difficult to ensure gas permeability in the furnace lower portion due to increases in the melting point and the viscosity of the slag. Consequently, by configuring the content of aluminum oxide in the reduced iron molded product to be less than or equal to the upper limit, an increase in the amount of the coke used can be inhibited. Note that the content of the aluminum oxide is only required to be greater than 0% by mass, but the lower limit of the content of the aluminum oxide is more preferably 0.5% by mass. When the content of the aluminum oxide is less than the lower limit, the reduced iron molded product becomes expensive, and the production cost of the pig iron may be increased.

(Second Layer)

The second layer 20 contains coke 21.

The coke 21 serves: as a heat source for melting the iron ore material 11; to generate CO gas as a reducing agent necessary for reduction of the DIR iron ore material 11; as a recarburizing agent for carburizing the molten iron to lower the melting point; and as a spacer for ensuring gas permeability in the blast furnace 1.

(Charging Method)

Various methods can be used as a method for alternately charging the first layer 10 and the second layer 20. The method is described herein with reference to, as an example, the blast furnace 1 equipped with a bell-armor type raw material charging device 2 (hereinafter, may be also merely referred to as "raw material charging device 2") illustrated in FIG. 2.

The raw material charging device 2 is provided in a furnace top portion. In other words, the first layer 10 and the second layer 20 are charged from the furnace top. The raw material charging device 2 includes, as illustrated in FIG. 2, a bell cup 2a, a lower bell 2b, and an armor 2c.

The bell cup 2a is where the raw material to be charged is loaded. When the first layer 10 is charged, the raw material constituting the first layer 10 is loaded into the bell cup 2a, and when the second layer 20 is charged, the raw material constituting the second layer 20 is loaded into the bell cup 2a.

The lower bell 2b is in a cone shape expanding downward, and is provided inside the bell cup 2a. The lower bell 2b is vertically movable (FIG. 2 shows an upward moved state with a solid line, and a downward moved state with a dotted line). The lower bell 2b is configured to seal a lower portion of the bell cup 2a when moved upward, and to form a gap on an extended line of a lateral wall of the bell cup 2a when moved downward.

The armor 2c is provided on a lower side with respect to the lower bell 2b, in a furnace wall portion of the blast furnace 1. When the lower bell 2b is moved downward, the raw material falls from the gap, while the armor 2c serves as a rebound plate for rebounding the fallen raw material. In addition, the armor 2c is configured to be protrudable and retractable with respect to a center (central portion) of the blast furnace 1.

By using the raw material charging device 2, the first layer 10 can be charged as follows. Note that the same applies to the second layer 20. In addition, the first layer 10 and the second layer 20 are alternately charged.

First, the lower bell 2b is positioned on the upper side and the raw material of the first layer 10 is charged into the bell cup 2a. When the lower bell 2b is positioned on the upper side, the lower portion of the bell cup 2a is sealed, whereby the raw material is loaded in the bell cup 2a. Note that the loaded amount is an amount of each layer to be charged.

Next, the lower bell 2b is moved downward. As a result, a gap is generated from the bell cup 2a, and the raw material falls through the gap in the furnace wall direction to hit the armor 2c. The raw material that has hit and been rebounded by the armor 2c is charged into the furnace. The raw material falls while moving toward the furnace interior due to the rebound at the armor 2c, and is accumulated while flowing from the fallen position toward the central side of the furnace interior. Since the armor 2c is configured to be protrudable and retractable with respect to the central portion, the fallen position of the raw material can be adjusted by protruding and retracting the armor 2c. This adjustment enables the first layer 10 to be accumulated in a desired shape.

Melting Step

In the melting step S2, the iron ore material 11 in the charged first layer 10 is reduced and melted while an auxiliary reductant is injected into the blast furnace by hot air blown from the tuyere 1a. Note that the operation of the blast furnace is continuous, and thus the melting step S2 is carried out continuously. On the other hand, the charging step S1 is carried out intermittently, and the first layer 10 and the second layer 20 to be processed in the melting step S2 are added according to the circumstances of the reduction and melting process of the first layer 10 and the second layer 20 in the melting step S2.

FIG. 2 illustrates a state in the melting step S2. As illustrated in FIG. 2, a raceway A, which is a hollow portion in which the coke 21 whirls and is present in an extremely sparse state, is formed in the vicinity of the tuyere 1a due to the hot air from the tuyere 1a. In the blast furnace 1, the temperature in the raceway A is the highest, being about 2,000° C. A deadman B, which is a pseudo-stagnation zone of the coke inside the blast furnace 1, is present adjacent to the raceway A. In addition, the dripping zone C, the cohesive zone D, and the lumpy zone E are present in an upward direction in this order from the deadman B.

The temperature in the blast furnace 1 increases from a top portion toward the raceway A. In other words, the temperature increases in the order of the lumpy zone E, the cohesive zone D, and the dripping zone C. For example, the temperature of the lumpy zone E is about greater than or equal to 20° C. and less than or equal to 1,200° C., while the temperature of the deadman B is about greater than or equal to 1,200° C. and less than or equal to 1,600° C. Note that the temperature of the deadman B varies in the radial direction, and the temperature of a central portion of the deadman B may be lower than the temperature of the dripping zone C. In addition, by stably circulating the hot air in the central portion in the furnace, the cohesive zone D having an inverted V-shaped cross section is formed, whereby gas permeability and reducibility are ensured in the furnace.

In the blast furnace 1, the iron ore material 11 is first heated and reduced in the lumpy zone E. In the cohesive zone D, the iron ore reduced in the lumpy zone E is softened and shrunk. The softened and shrunk iron ore falls as the drip slag, and moves to the dripping zone C. In the melting step S2, reduction of the iron ore material 11 proceeds principally in the lumpy zone E, while melting of the iron ore material 11 proceeds principally in the dripping zone C. Note that in the dripping zone C and the deadman B, direct reduction proceeds, which is a direct reaction between the fallen liquid iron oxide FeO and carbon in the coke 21.

The aggregate 12 containing the reduced iron molded product exerts the aggregate effect in the cohesive zone D. In other words, even in a state in which the iron ore has been softened and shrunk, the reduced iron molded product having a high melting point is not softened, and secures a gas permeation channel ensuring permeation of the hot air to the central portion of the blast furnace 1.

In addition, the molten iron F obtained by melting the reduced iron is accumulated on a hearth portion, and a molten slag G is accumulated on the molten iron F. The molten iron F and the molten slag G can be tapped from the taphole 1b.

The auxiliary reductant to be injected from the tuyere 1a is exemplified by: finely pulverized coal obtained by finely pulverizing coal to have a grain size of about 50 μm; heavy oil; natural gas; and the like. The auxiliary reductant serves as a heat source, a reduction agent, and a recarburizing agent. In other words, of the roles played by the coke 21, the roles other than that of the spacer are substituted by the auxiliary reductant.

Advantages

In the production method of pig iron, the first layer 10 containing the iron ore material 11 contains, as an aggregate 12, a reduced iron molded product obtained through compression molding of reduced iron. Since the reduced iron molded product facilitates the passing of hot air during softening and fusing of the first layer 10 in the melting step S2, the production method of pig iron can decrease the amount of the coke 21 for ensuring gas permeability. Consequently, using the production method of pig iron enables a decrease in the amount of the coke 21 used while maintaining stable operation of the blast furnace.

Second Embodiment

Figure 4:
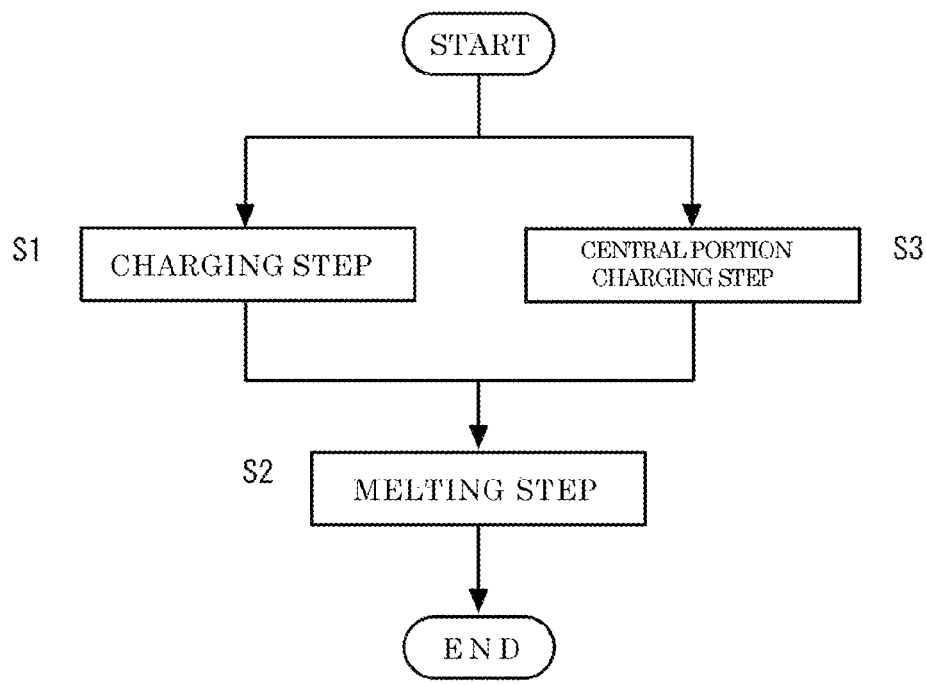
FIG. 4 is a flow diagram illustrating the production method of pig iron according to another embodiment of the present invention different from FIG. 1.

A production method of pig iron shown in FIG. 3 using a blast furnace 1 with a tuyere 1a illustrated in FIG. 4 includes: a step (charging step S1) of charging a first layer 10 containing an iron ore material 11 and a second layer 20 containing coke 21 alternately in the blast furnace 1; and a step (melting step S2) of reducing and melting the iron ore material 11 in the charged first layer 10 while injecting an auxiliary reductant into the blast furnace 1 by hot air blown from the tuyere 1a, in which: an aggregate 12 for letting through the hot air to a central portion of the blast furnace 1 is blended into the first layer 10; and the aggregate 12 contains a reduced iron molded product obtained through compression molding of reduced iron. The production method of pig iron also comprises a central portion charging step S3.

Blast Furnace

Since the blast furnace 1 is identical to the blast furnace 1 according to the first embodiment, the same configuration is denoted by the same number and detailed description thereof is omitted.

Charging Step (First Layer)

It is preferred that the iron ore material 11 contains iron ore pellet, of which porosity resulting from large open pores having a pore size of greater than or equal to 4 μm is greater than or equal to 21%. The iron ore pellet is made by using pellet feed, iron ore fine powder, and an auxiliary material as needed, and are made with characteristics suitable for the blast furnace (for example, size, strength, reducibility, and the like) in order to improve quality.

The iron ore pellet is principally composed of coarse grains, which are pellet feed, and fine powder, which is pulverized iron ore material, and have a large number of pores formed thereinside. As described above, the iron ore pellet may contain the auxiliary material. The auxiliary material is exemplified by limestone, dolomite, and the like.

The present inventors have found that, due to the iron ore material 11 containing the iron ore pellet, of which the porosity resulting from the large open pores having the pore size of greater than or equal to 4 μm is greater than or equal to 21%, a reduction percentage of the iron ore material can be increased. Due to the iron ore material 11 containing the iron ore pellet, further a decrease in the amount of the coke used is enabled. The lower limit of the porosity resulting from the large open pores is more preferably 23% and still more preferably 25%.

The lower limit of crushing strength of the iron ore pellet is preferably 180 kg/P, more preferably 190 kg/P, and still more preferably 200 kg/P. When the crushing strength is less than the lower limit, the iron ore pellet 1 may be more likely to be pulverized in the blast furnace, leading to difficulty in operation of the blast furnace.

The iron ore pellet preferably have an aggregate structure of fine powder. Having the aggregate structure of fine powder can increase the crushing strength while increasing the porosity resulting from the large open pores having the pore size of greater than or equal to 4 μm. As used herein, the "aggregate structure" refers to a state in which a plurality of particles of dispersed fine powder gather to form a secondary particle, specifically to a state in which at least five, and preferably at least ten particles of fine powder are in contact. Note that the "fine powder" refers to particles smaller than 0.5 mm in diameter (grain size) of a sphere of the same volume.

Note that using carbon composite agglomerated iron ore instead of, or together with, the iron ore pellet produces a similar effect.

The upper limit of a content of the reduced iron molded product in the first layer 10 is 30% by mass and more preferably 25% by mass. Since the reduced iron molded product is larger than the iron ore material 11 and great in individual weight, when charged to the blast furnace 1 together with the iron ore material 11, the reduced iron molded product is likely to be separated from the iron ore material 11 and segregated. By configuring the content of the reduced iron molded product to be less than or equal to the upper limit, the separation and segregation can be inhibited, whereby an iron ore deposition inclination angle is stabilized at a low level. Therefore, the reduced iron molded product is relatively uniformly present in the first layer 10, whereby permeation of the hot air to the central portion of the blast furnace 1 can be ensured. Consequently, a decrease in the amount of the coke 21 used is enabled. In addition, instability of the first layer 10 due to segregation of the reduced iron molded product can be avoided, whereby melting from a lower side in the melting step S2 and occurrence of layer collapse during falling of an upper layer can be inhibited. Note that the "iron ore deposition inclination angle" refers to an angle of an inclined face of an iron ore deposition layer (such as the first layer 10) from the horizon.

The lower limit of a charged rate of the reduced iron molded product is preferably 100 kg and more preferably 150 kg per 1 ton of the pig iron. When the charged rate of the reduced iron molded product is less than the lower limit, the function of the aggregate 12 ensuring gas permeability in the cohesive zone D in the melting step S2 may not be sufficiently exerted.

The lower limit of a ratio of an average grain size of the reduced iron molded product to an average grain size of the iron ore material 11 is preferably 1.3, and more preferably 1.4. When the ratio of the average grain size is less than the lower limit, the aggregate effect of the reduced iron molded product is more likely to be exerted, whereby the gas permeability in the cohesive zone D may be lowered.

The upper limit of a gas permeability resistance index of the reduced iron molded product after a tumbler rotation test is preferably 0.1, and more preferably 0.08. When the gas permeability resistance index is greater than the upper limit, the gas permeability in the lumpy zone E may be lowered.

The lower limit of the basicity of the reduced iron molded product is preferably 0.9 and more preferably 1.0. When the basicity of the reduced iron molded product is less than the lower limit, the contraction starting temperature of the reduced iron molded product is lowered, whereby contraction of the first layer 10 is facilitated in the cohesive zone D, leading to the lowered gas permeability.

The reduced iron molded product may contain aluminum oxide. When the reduced iron molded product contains aluminum oxide, the upper limit of the content of the aluminum oxide in the reduced iron molded product is preferably 1.5% by mass and more preferably 1.3% by mass. When the content of the aluminum oxide is greater than the upper limit, the gas permeability in the furnace lower portion may be lowered due to increases in the melting point and the viscosity of the slag.

(Second Layer)

The second layer 20 is configured in a similar manner to the second layer 20 according to the first embodiment, and detailed description thereof is omitted.

(Charging Method)

A similar method to the method described in the first embodiment can be used as a method for alternately charging the first layer 10 and the second layer 20, and detailed description thereof is omitted.

Central Portion Charging Step

Figure 5:
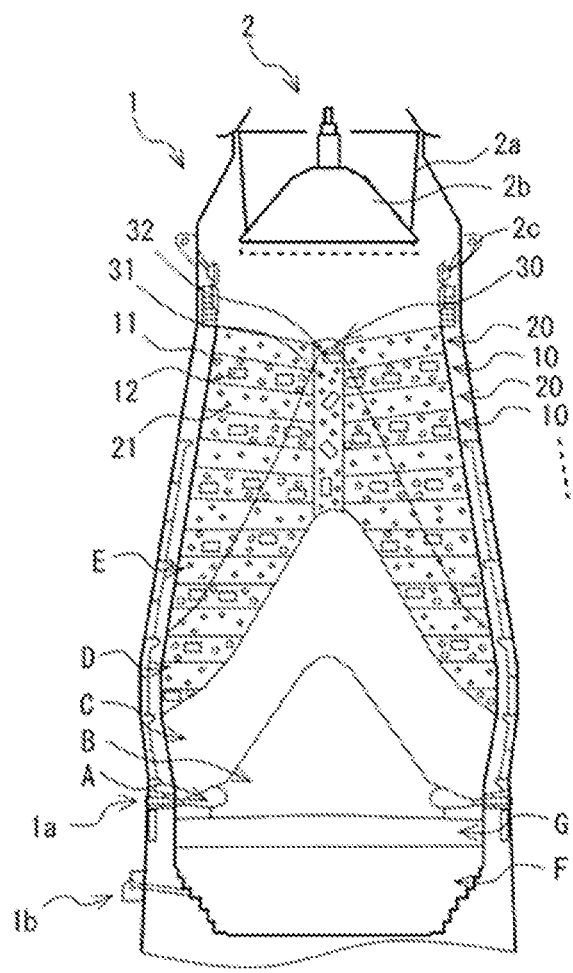
FIG. 5 is a schematic view illustrating the inside of the blast furnace used in the production method of pig iron of FIG. 4.

In the central portion charging step S3, a mixture of the coke 31 and the reduced iron molded product 32 is charged to the central portion of the blast furnace 1. Charging of the mixture forms a central layer 30 as illustrated in FIG. 5.

(Central Layer)

In the reduced iron molded product 32 in the mixture, a proportion of the reduced iron molded product having a grain size of less than or equal to 5 mm is preferably greater than or equal to 90% by mass, and more preferably greater than or equal to 95% by mass. The hot air blown from the tuyere 1a in the melting step S2 and having reached the central portion of the blast furnace 1 heats the central layer 30. By including the reduced iron molded product having a grain size of greater than or equal to 5 mm in the central layer 30 with a content being greater than or equal to the lower limit, the sensible heat of high temperature gas can be collected without disturbing the flow of the hot air. In addition, the reduced iron molded product 32 having a small grain size is likely to be re-oxidized. The re-oxidized reduced iron molded product 32 requires re-reduction, resulting in lowering of the temperature of the central portion of the blast furnace 1 where high temperature is preferred. In addition, the re-oxidized reduced iron molded product 32 reacts with the coke in the central layer 30 and the deadman B, and deteriorates the coke. As described above, by including the reduced iron molded product having a grain size of greater than or equal to 5 mm, which is less likely to be re-oxidized, with a content being greater than or equal to the lower limit, the sensible heat can be effectively used. Consequently, a further decrease in the amount of the coke 21 used is enabled. Note that the upper limit of the grain size of the reduced iron molded product 32 is not particularly limited, and may be, for example, 100 mm.

The greater content of the reduced iron molded product 32 in the mixture is preferred in light of a decrease in the amount of the coke 31 used; however, the upper limit of the content is preferably 75% by mass and more preferably 70% by mass. When the content is greater than the upper limit, the gas permeability in the central layer 30 may be lowered.

(Charging Method)

Charging of the central layer 30 can be carried out by various methods, and for example, may be carried out by using the bell-armor type raw material charging device 2 in a similar manner to the first layer 10 and the second layer 20. Specifically, between charging of the first layer 10 and of the second layer 20, in other words after charging the first layer 10 and before charging the next second layer 20, and after charging the second layer 20 and before charging the next first layer 10, it is preferred to charge a part of the central layer 30 (a thickness thereof corresponding to the thickness of the second layer 20 or the first layer 10 to be charged immediately thereafter) in the central portion of the blast furnace 1 by using the raw material charging device 2. In other words, the charging step S1 and the central portion charging step S3 proceed simultaneously.

Melting Step

The melting step S2 may be similar to the melting step S2 according to the first embodiment, and detailed description thereof is omitted.

Advantages

In the production method of pig iron, by configuring the content of the reduced iron molded product in the first layer 10 to be less than or equal to 30% by mass, the separation and segregation of the reduced iron molded product in the peripheral portion of the blast furnace can be inhibited. Therefore, the reduced iron molded product is relatively uniformly present to the central portion of the blast furnace 1 and exerts an aggregate effect in the cohesive zone D, whereby permeation of the hot air in the melting step S2 to the central portion of the blast furnace 1 can be ensured.

The production method of pig iron includes a step of charging a mixture of the coke 31 and the reduced iron molded product 32 to the central portion of the blast furnace 1, in which: in the reduced iron molded product in the mixture, a proportion of the reduced iron molded product having a grain size of greater than or equal to 5 mm is greater than or equal to 90% by mass; and a content of the reduced iron molded product in the mixture is less than or equal to 75% by mass. By thus including the reduced iron molded product of a large grain size in the central portion with a content being less than or equal to the upper limit, the sensible heat can be effectively used without disturbing the flow of the hot air.

As described above, the production method of pig iron enables a decrease in the amount of the coke used.

Third Embodiment

Figure 6:
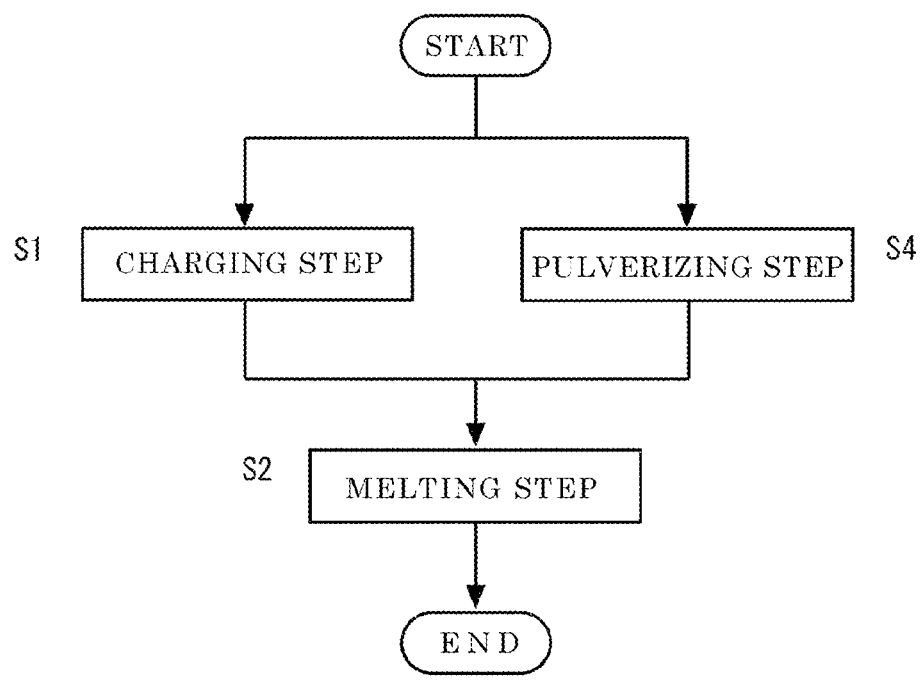
FIG. 6 is a flow diagram illustrating the production method of pig iron according to still another embodiment of the present invention different from FIGS. 1 and 4.

A production method of pig iron shown in FIG. 6 using a blast furnace 1 with a tuyere 1a illustrated in FIG. 1 includes: a step (charging step S1) of charging a first layer 10 containing an iron ore material 11 and a second layer 20 containing coke 21 alternately in the blast furnace 1; and a step (melting step S2) of reducing and melting the iron ore material 11 in the charged first layer 10 while injecting an auxiliary reductant into the blast furnace 1 by hot air blown from the tuyere 1a, in which: an aggregate 12 for letting through the hot air to a central portion of the blast furnace 1 is blended into the first layer 10; and the aggregate 12 contains a reduced iron molded product obtained through compression molding of reduced iron. The production method of pig iron further includes a fine pulverizing step S4.

Blast Furnace

Since the blast furnace 1 is identical to the blast furnace 1 according to the first embodiment, description thereof is omitted.

Charging Step

The charging step S1 may be carried out in a similar manner to the charging step according to the first embodiment, and detailed description thereof is omitted.

Fine Pulverizing Step

In the fine pulverizing step S4, powder derived from the reduced iron molded product and coal is finely pulverized.

A part of the reduced iron molded product is pulverized into powder due to a conveying process and the like. The powder has a large specific surface area, and is thus re-oxidized into iron oxide. The powder of the re-oxidized reduced iron lowers gas permeability in the blast furnace 1, and is not appropriate for use in the first layer 10. Such a reduced iron molded product that is not used in the first layer 10 is used in the fine pulverizing step S4.

The upper limit of the grain size of the reduced iron molded product pulverized in the fine pulverizing step S4 is preferably 3 mm and more preferably 1 mm. When the grain size is greater than the upper limit, the re-oxidization degree is low and the metallization rate is high, whereby a sufficient function as a flux for improving gas permeability in a bird's nest may not be obtained.

The fine pulverization can be carried out by using a roller mill, a ball mill, or the like. The maximum grain size of the fine pulverized reduced iron molded product and the coal is preferably less than or equal to 500 μm, and an average grain size thereof is preferably less than or equal to 100 μm.

Melting Step

The melting step S2 is similar to the melting step S2 according to the first embodiment, except for including the fine powder 41 obtained in the fine pulverizing step S4 as the auxiliary reductant. Including the fine powder 41 as the auxiliary reductant will be described later, and other descriptions are omitted.

Figure 7:
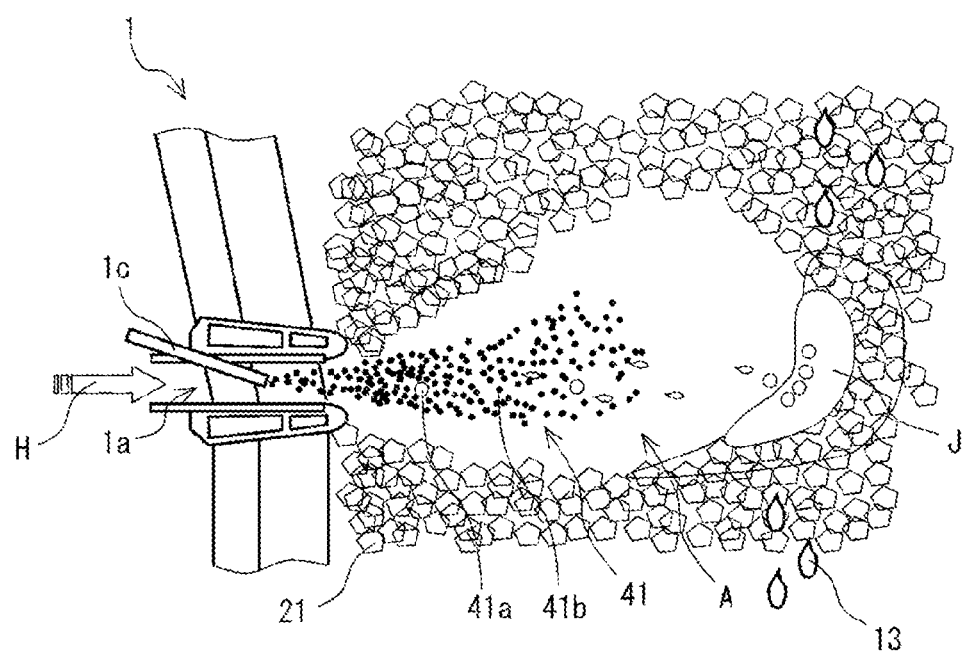
FIG. 7 is a drawing schematically illustrating a treatment conducted in a tuyere during a melting step in FIG. 6.

As shown in FIG. 7, the blast furnace 1 is provided with an auxiliary reductant injection opening 1c connected to the tuyere 1a. The fine powder 41 is injected from the auxiliary reductant injection opening 1c to the tuyere 1a. The fine powder 41 contains the reduced iron molded product (pulverized reduced iron 41a) and the coal (pulverized coal 41b) obtained in the fine pulverizing step S4. The auxiliary reductant injection opening 1c has an outlet directed to a downstream side of the hot air H such that the auxiliary reductant is carried by an airflow of the hot air H blown from the tuyere 1a, whereby the fine powder 41 is injected deep into the raceway A.

The raceway A is, as described above, a hollow portion in which the coke 21 whirls and is present in an extremely sparse state, in contrast to a region therearound filled with the coke 21 (see FIG. 7). The injected auxiliary reductant is principally blown onto the coke 21 deep in the raceway A. Consequently, an acidic slag derived from ash generated from the pulverized coal 41b molten deep in the raceway A is increased, whereby a bird's nest slag J, which is a slag layer in which a slag with increased viscosity and melting point is accumulated (held up), is formed. As the bird's nest slag J grows, the gas permeability in the furnace lower portion is deteriorated in the vicinity of the raceway A in the blast furnace 1.

Here, the fine powder 41 includes the re-oxidized reduced iron molded product as described above. The auxiliary reductant containing the iron oxide injected from the tuyere 1a is heated and melted in the raceway A, integrated and slagged with the bird's nest slag J previously formed, and rapidly drips as the drip slag 13. As a result, growth of the bird's nest slag J is inhibited, whereby gas permeability can be maintained. By maintaining gas permeability, permeation of the hot air H to the central portion of the blast furnace 1 is facilitated, resulting in a decrease in the amount of the coke 21 used.

The lower limit of an injected amount of the reduced iron molded product included in the fine powder 41 is preferably 3 kg and more preferably 5 kg per 1 ton of the pig iron. When the injected amount is less than the lower limit, the effect of improving gas permeability may be insufficient.

Advantages

In the production method of pig iron, by pulverizing powder derived from the reduced iron molded product and using the powder as the auxiliary reductant to be injected from the tuyere 1a, the reduced iron molded product can be effectively used and gas permeability in the blast furnace can be improved.

Other Embodiments

The present invention is not in any way limited to the above-described embodiments.

In the case described in the first embodiment, (1) a charged rate of the reduced iron molded product is greater than or equal to 100 kg per 1 ton of the pig iron; a ratio of an average grain size of the reduced iron molded product to an average grain size of the iron ore material is greater than or equal to 1.3; and a gas permeability resistance index of the reduced iron molded product after a tumbler rotation test is less than or equal to 0.1, (2) basicity of the reduced iron molded product is greater than or equal to 0.9, and (3) the reduced iron molded product contains aluminum oxide, and a content of the aluminum oxide in the reduced iron molded product is less than or equal to 1.5% by mass. However, not all the conditions (1) to (3) are essential, and a production method of pig iron satisfying only two or one of the above three conditions is also encompassed by the present invention. Satisfying any of the above three conditions improves gas permeability of the cohesive zone and intensifies the center gas flow, whereby the amount of the coke used can be improved. Note that, in a case in which the condition (3) of the above conditions is not included, it is not essential that the reduced iron molded product contains aluminum oxide.

Although the case in which the production method of pig iron includes the central portion charging step has been described in the second embodiment, the central portion charging step is not an essential step and may be omitted. Even when the central portion charging step is omitted, a decrease in the amount of the coke used is enabled.

Alternatively, the central portion charging step may be included in the production method of pig iron according to the first embodiment.

Although the case of employing the bell-armor type as the charging method or the charging method in the charging step according to the first embodiment and the second embodiment and in the central portion charging step according to the second embodiment has been described, other types may also be employed. The other types include a bell-less type. With the bell-less type, charging or charging can be carried out by using a swivel chute and adjusting the angle thereof.

In addition, the case of carrying out the charging of the first layer and the second layer separately from the charging of the central layer has been described in the second embodiment; however, the charging and the charging may be carried out at once with the same device. For example, with the above-described bell-less type, it is possible to charge the first layer or the second layer with adjustment of the angle of the swivel chute, while carrying out the charging to the central portion by the chute.

Although the configuration of adding the fine pulverizing step to the first embodiment has been described in the third embodiment, a configuration of adding the fine pulverizing step to the second embodiment may also be employed.

Examples

Hereinafter, the embodiments of the present invention will be explained in detail by way of Examples; however, the present invention is not limited to these Examples.

Grain Size Ratio

An effect of a ratio of an average grain size of the reduced iron molded product to an average grain size of the iron ore material (hereinafter also referred to as "HBI grain size ratio") on gas permeability was studied by conducting a large-scale reduction under load test simulating the peripheral portion of the blast furnace.

Figure 8:
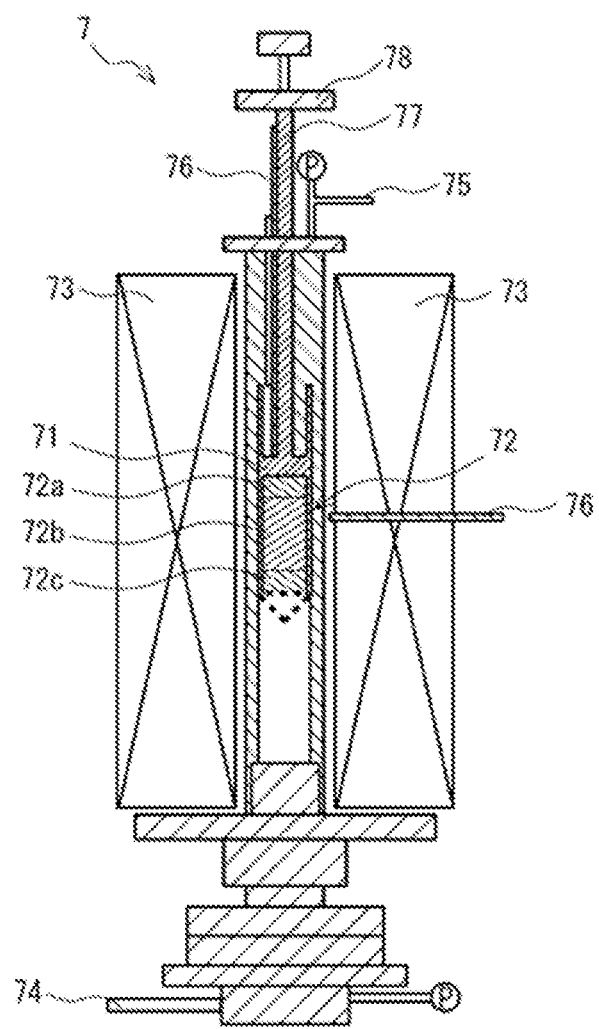
FIG. 8 is a schematic cross-sectional view illustrating a configuration of a furnace for a large-scale reduction under load test used in Example.

FIG. 8 illustrates a furnace for a large-scale reduction under load test 7 used in this experiment. A graphite crucible 71 to be filled with a sample was configured to have an inner diameter of 75 mm. A sample filler layer 72 was constituted of, from the top, an upper coke layer 72a (20 mm in height), an iron ore layer 72b (110 mm in height), and a lower coke layer 72c (40 mm in height). The iron ore layer 72b corresponds to the first layer 10 of the present invention, and the upper coke layer 72a and the lower coke layer 72c correspond to the second layer 20.

The iron ore layer 72b was configured with a mixture of the reduced iron molded product (HBI), sintered iron ore (11.2 to 13.2 mm in grain size), iron ore pellet (8.0 to 11.2 mm in grain size), and lump iron ore (11.2 to 13.2 mm in grain size). In the iron ore layer 72b, the total iron content (T. Fe) was configured to be constant. In addition, by varying the grain size of the HBI, a ratio of the average grain size of the HBI to the average grain size of the iron ore material was varied. Specifically, three types of the HBI were prepared: (1) 8.0 to 11.2 mm in grain size; (2) 11.2 to 13.2 mm in grain size; and (3) 13.2 to 16.0 mm in grain size. Chemical characteristics of the HBI used are shown in Table 1. A charged rate of the HBI was 400 kg per 1 ton of pig iron.

TABLE 1

| Contents | | | | | | | Metal- lization Degree [mass %] | Basicity C/S (—) |
|---|---|---|---|---|---|---|---|---|
| T·Fe [mass %] | FeO [mass %] | M·Fe [mass %] | SiO$_2$ [mass %] | CaO [mass %] | Al$_2$O$_3$ [mass %] | MgO [mass %] | | |
| 92.02 | 4.66 | 85.50 | 1.97 | 0.91 | 0.80 | 0.05 | 92.9 | 0.46 |

Figure 9:
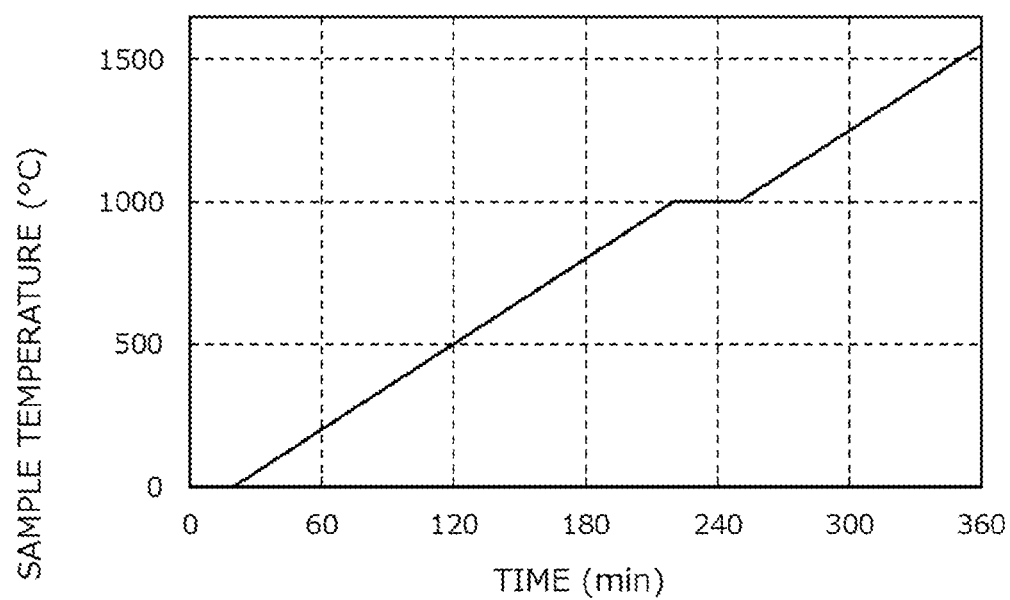
FIG. 9 is a graph showing a temperature profile of heating a sample filler layer in Example studying the maximum pressure loss illustrated in FIGS. 11 to 14.
Figure 10:
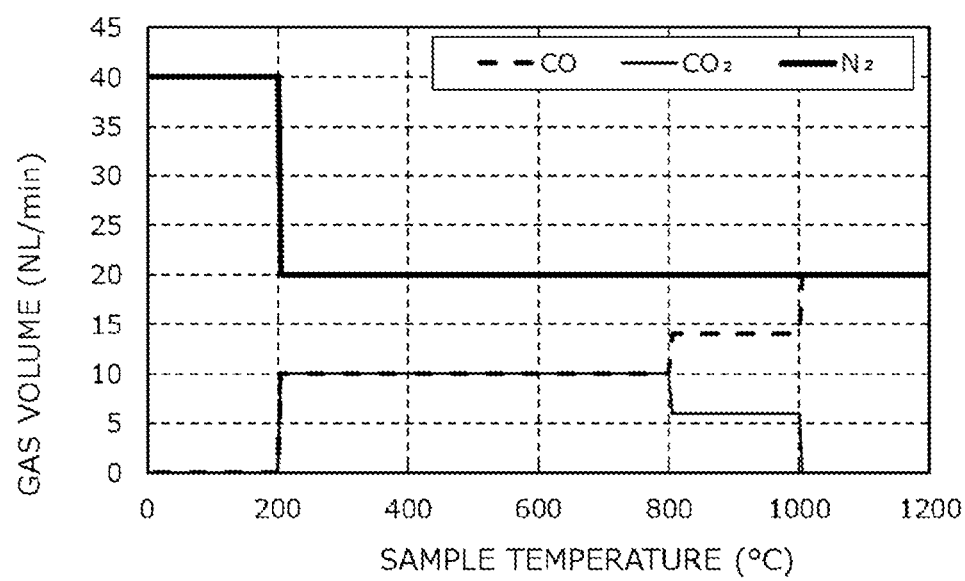
FIG. 10 is a graph showing a relationship between the temperature of the sample filler layer and a gas flow rate to be supplied in Example studying the maximum pressure loss illustrated in FIGS. 11 to 14.

While heating the sample filler layer 72 with a temperature profile shown in FIG. 9 by using an electric furnace 73, gas (reducing gas) of a composition shown in FIG. 10 was supplied thereto. The gas was supplied from a gas supply pipe 74 provided in a lower portion of the furnace for a large-scale reduction under load test 7, and discharged from a gas discharge pipe 75 provided in an upper portion. A total feed rate of the gas was 40 NL/min, and temperature control was carried out by two thermocouples 76. In addition, a load applied to the sample filler layer 72 was 1 kgf/cm$^2$. The load was applied by applying a weight of a weight 78 via a load rod 77.

A pressure loss of the sample filler layer 72 was continuously measured, and the maximum value (maximum pressure loss) was recorded. The greater maximum pressure loss indicates lower gas permeability. The results are shown in FIG. 11.

Figure 11:
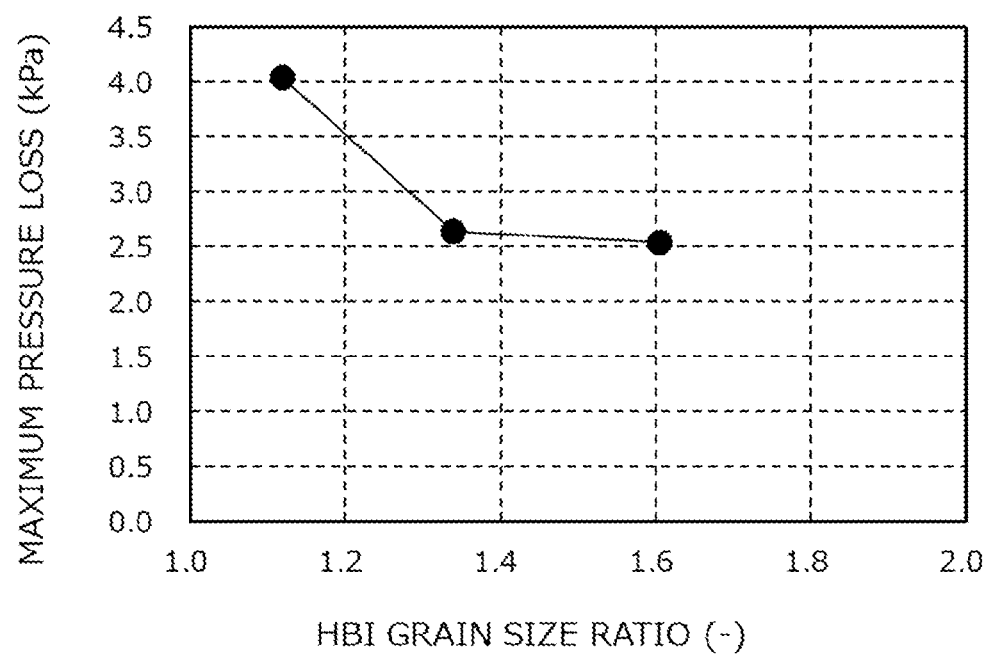
FIG. 11 is a graph showing a relationship between a HBI grain size ratio and the maximum pressure loss in Example.

The results shown in FIG. 11 indicate that the HBI grain size ratio being greater than or equal to 1.3 facilitates exertion of the aggregate effect (an effect in which, when the iron ore material layer is softened and shrunk, the HBI composed mainly of M. Fe and having a high melting point is not softened and serves as an aggregate to suppress layer shrinkage, resulting in generation of a gap around the HBI where the gas flows).

Charged Rate

An effect of a charged rate of the HBI per 1 ton of pig iron on gas permeability was studied by conducting a large-scale reduction under load test simulating the peripheral portion of the blast furnace.

A similar experiment to the above-described Example related to the grain size ratio was conducted with different charged rates of the HBI per 1 ton of the pig iron, the grain size of the HBI fixed to 13.2 to 16.0 mm (HBI grain size ratio=1.6). The results are shown in FIG. 12.

Figure 12:
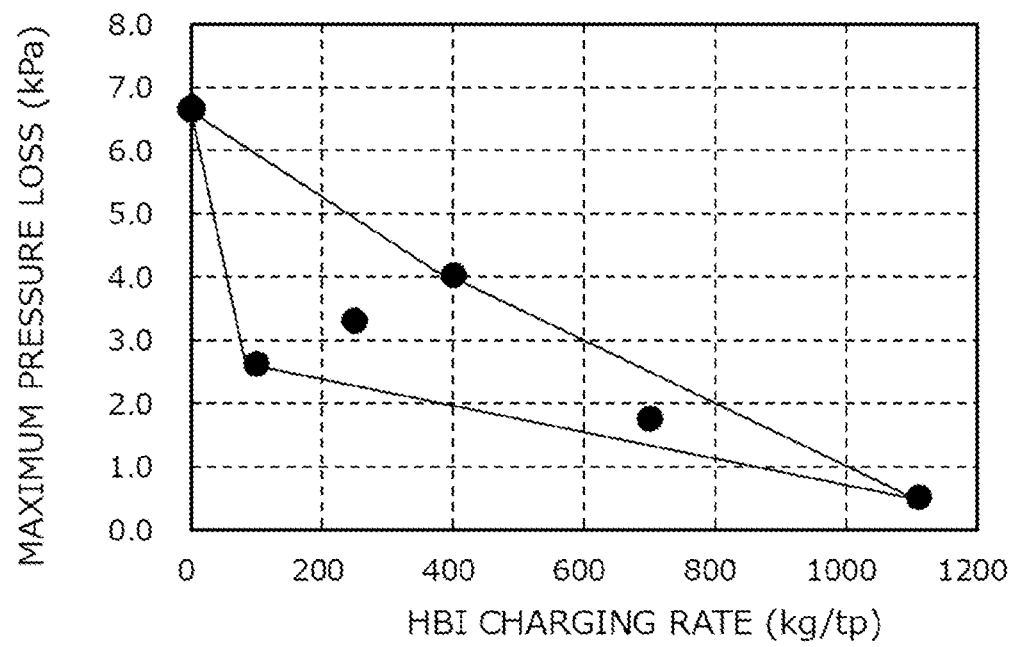
FIG. 12 is a graph showing a relationship between a HBI charged rate and the maximum pressure loss in Example.

The results shown in FIG. 12 indicate that the charged rate of the HBI per 1 ton of pig iron being greater than or equal to 100 kg facilitates exertion of the aggregate effect.

Basicity

An effect of basicity of the HBI on gas permeability was studied by conducting a large-scale reduction under load test simulating the peripheral portion of the blast furnace.

Two types of the HBI containing T. Fe and Al$_2$O$_3$ in the following contents were prepared:
case (1): T. Fe=74.2 to 80.4% by mass, and
Al$_2$O$_3$=1.99 to 2.20% by mass; and
case (2): T. Fe=89.9 to 91.7% by mass, and
Al$_2$O$_3$=0.66 to 1.31% by mass.

In regard to the two types of the HBI, the maximum pressure loss was measured with the grain size of the HBI being 13.2 to 16.0 mm (HBI grain size ratio=1.6), the charged rate of the HBI per 1 ton of the pig iron being 250 kg, and different basicities. The basicity was adjusted by changing the amount of the auxiliary material such as limestone and the brand of the iron ore. Note that other conditions were the same as those in the above-described Example related to the grain size ratio. The results are shown in FIG. 13.

Figure 13:
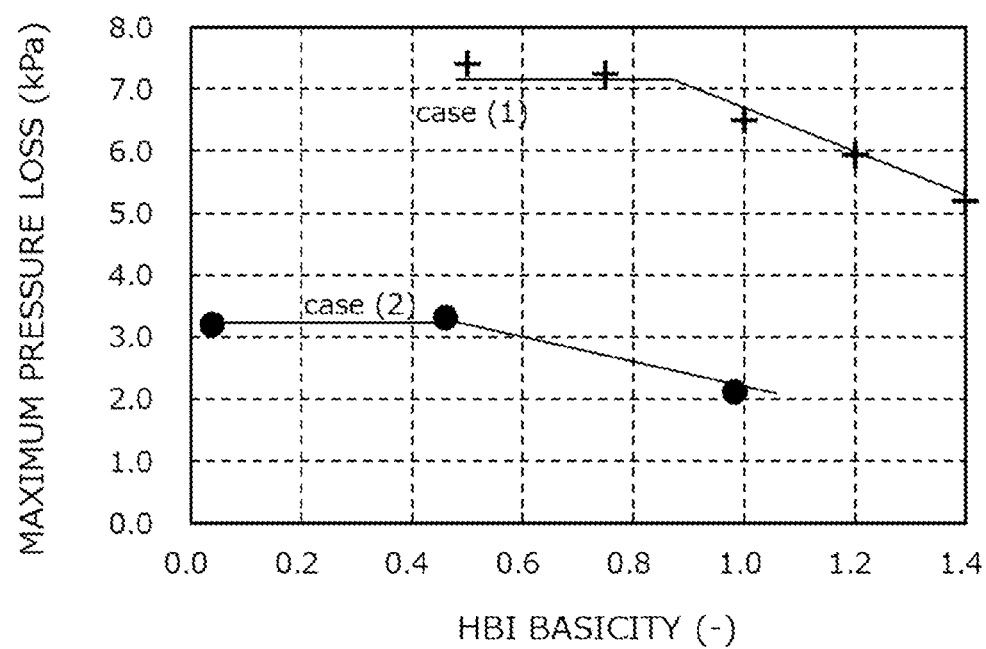
FIG. 13 is a graph showing a relationship between basicity of HBI and the maximum pressure loss in Example.

The results shown in FIG. 13 indicate that, regardless of the type of the HBI, the basicity being greater than or equal to 0.9 facilitates exertion of the aggregate effect. Note that, with the same basicity, case (2) with the higher T. Fe (smaller slag component) and the lower Al$_2$O$_3$ content provides the lower maximum pressure loss.

Aluminum Oxide Content

An effect of the content of aluminum oxide in the HBI on gas permeability was studied by conducting a large-scale reduction under load test simulating the peripheral portion of the blast furnace.

The types of HBI having characteristics of T. Fe=87.6 to 92.0% by mass and basicity=0.04 to 0.56, and different contents of Al$_2$O$_3$ were prepared. The graph shown in FIG. 13 indicates that, with the aforementioned content of the T. Fe, in a range of basicity being less than or equal to 0.56, the maximum pressure loss is not likely to be affected by the basicity.

The maximum pressure loss was measured under the same conditions as those of the above-described Example related to the grain size ratio, except for using the aforementioned HBI. The results are shown in FIG. 14.

Figure 14:
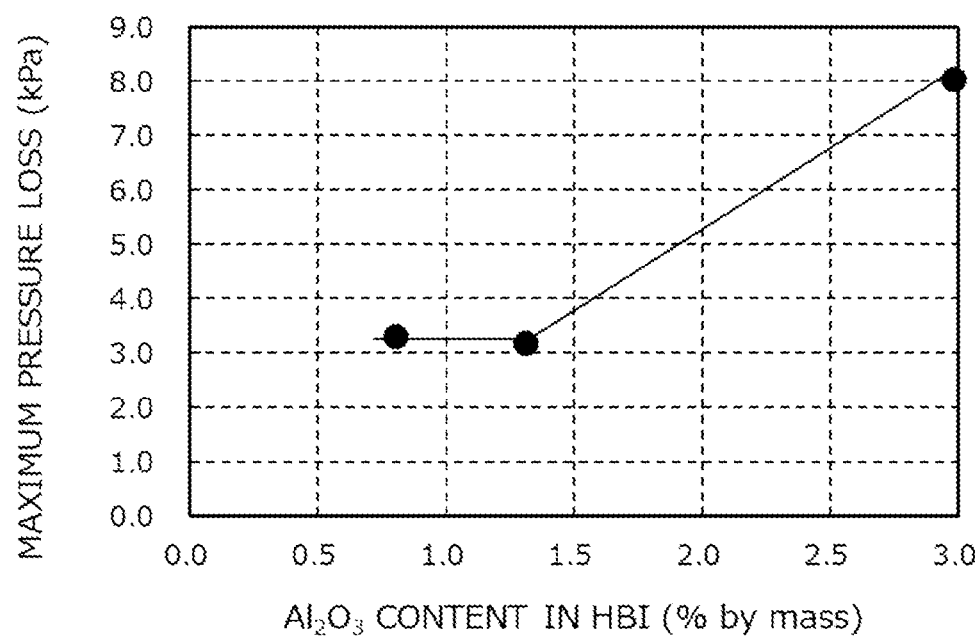
FIG. 14 is a graph showing a relationship between an $Al_2O_3$ content in the HBI and the maximum pressure loss in Example.

The results shown in FIG. 14 indicate that the content of Al$_2$O$_3$ being less than or equal to 1.5% by mass facilitates exertion of the aggregate effect. The content of Al$_2$O$_3$ being greater than 1.5% by mass is considered to result in deteriorated slag separability and slag drip characteristics due to increases in the melting point and the viscosity of the slag, resulting in an increase in the maximum pressure loss.

Content

An effect of the content of the HBI in the first layer 10 on gas permeability was studied by conducting a blast furnace burden distribution experiment simulating the bell-armor type raw material charging device.

Figure 15:
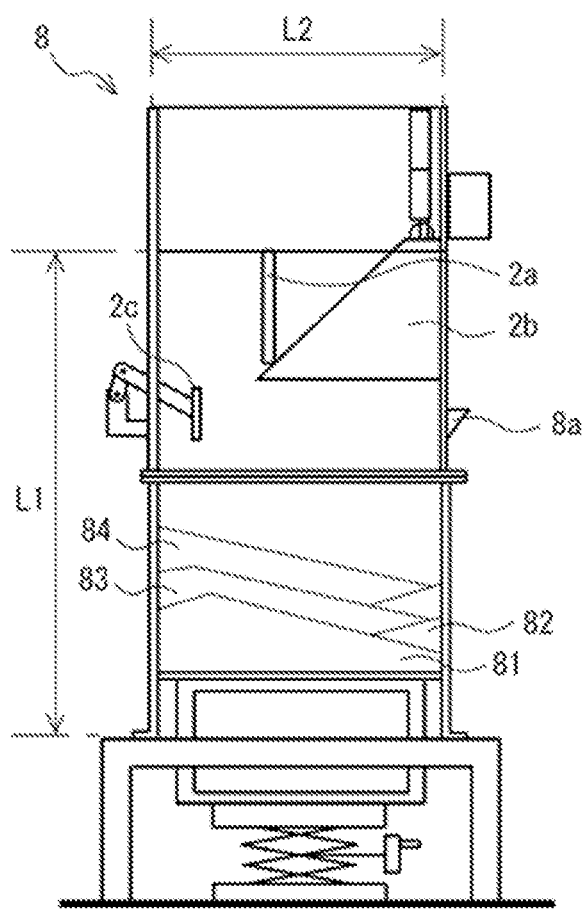
FIG. 15 is a schematic view illustrating a configuration of a blast furnace burden distribution test device used in Example.

FIG. 15 illustrates a blast furnace burden distribution experiment device 8 used in this experiment. The blast furnace burden distribution experiment device 8 illustrated in FIG. 5 is a two-dimensional slice cold model simulating the bell-armor type raw material charging device on a scale of 1/10.7. The size of the blast furnace burden distribution experiment device 8 is 1,450 mm in height (length of L1 in FIG. 15), 580 mm in width (length of L2 in FIG. 15), and 100 mm in depth (length in the perpendicular direction with respect to the sheet surface of FIG. 15).

Each constitutive element of the blast furnace burden distribution experiment device 8 is denoted by the same number as the corresponding constitutive element having the same function of the bell-armor type raw material charging device 2 illustrated in FIG. 2. Since the function is the same, detailed description thereof is omitted. In addition, as illustrated in FIG. 15, the blast furnace burden distribution experiment device 8 includes a center charging chute 8a simulating center charging, for charging the coke.

A coke layer 81 as a base, a center charged coke layer 82, and an iron ore layer 83 were sequentially charged to the blast furnace burden distribution experiment device 8, and then an experimental layer 84, which is an iron ore layer, was charged, and the iron ore deposition inclination angle θ was measured. The HBI is higher in metallization rate (lower in proportion of oxide) and lower in porosity compared to calcined iron ore (sintered iron ore and iron ore pellet) and lump iron ore, and is thus high in apparent density. In addition, the HBI is large in size and also large in mass per grain. Therefore, charging the HBI to the blast furnace together with the calcined iron ore and the lump iron ore is likely to cause separation and segregation. When separation and segregation occur and result in local segregation in the peripheral portion, the gas flow becomes a peripheral flow, leading to a risk of an increase in the reducing agent ratio due to wear of facility and an increase in heat loss.

Raw materials used for charging the experimental layer 84 were: sintered iron ore simulating sintered iron ore and lump iron ore (2.8 to 4.0 mm in grain size); alumina balls simulating the iron ore pellet (2 mm in diameter); coke simulating lump coke (8.0 to 9.5 mm in grain size); and an iron plate simulating the HBI (20×7×4 mm, 10×7×4 mm). The raw materials were on a scale of 2/11.2.

Figure 16:
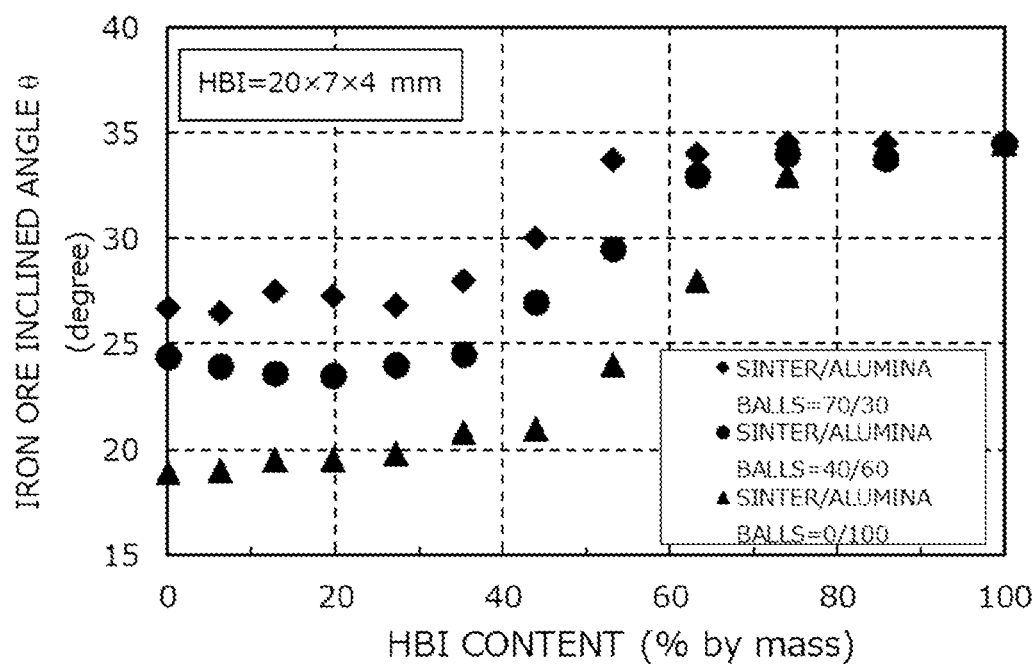
FIG. 16 is a graph showing a relationship between a content of HBI and an iron ore deposition inclination angle θ in Example when an iron plate has a size of 20×7×4 mm.

The sintered iron ore and the alumina balls were prepared in three ratios (sintered iron ore/alumina balls) of 70/30, 40/60, and 0/100, and the iron ore deposition inclination angle θ was measured for respective ratios with different HBI contents. FIG. 16 shows results in the case of the iron plate simulating the HBI being 20×7×4 mm in size, while FIG. 17 shows results in the case of 10×7×4 mm.

Figure 17:
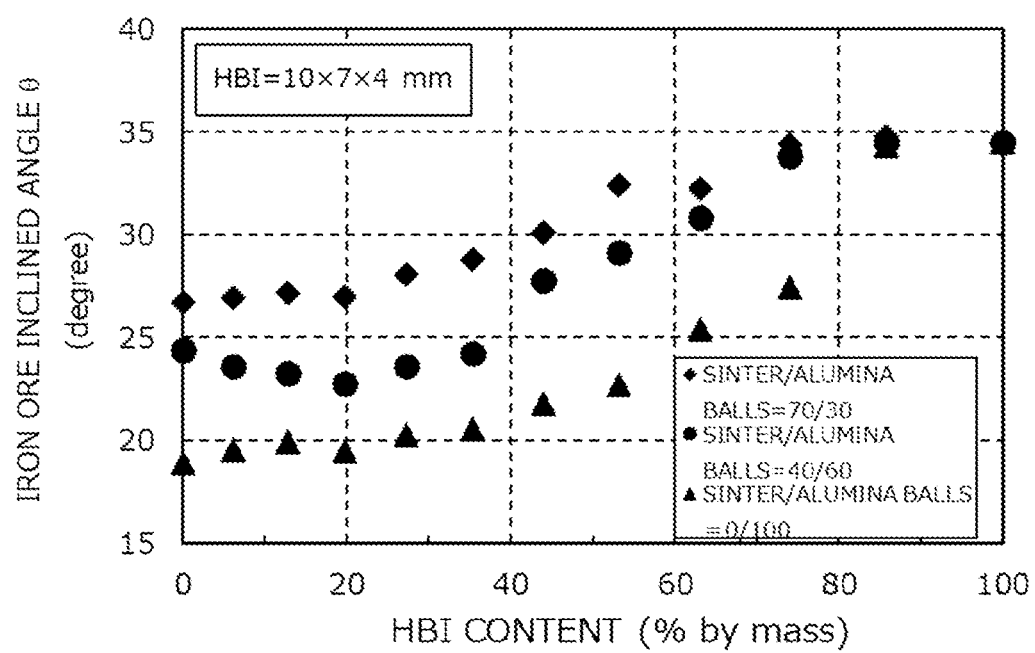
FIG. 17 is a graph showing a relationship between a content of HBI and an iron ore deposition inclination angle θ in Example when an iron plate has a size of 10×7×4 mm.

The results shown in FIG. 16 and FIG. 17 indicate that the iron ore deposition inclination angle θ is stabilized at a relatively low level when the content of the HBI is less than or equal to 30% by mass, regardless of the size of the iron plate simulating the HBI. On the other hand, when the content of the HBI is greater than 40% by mass, the iron ore deposition inclination angle θ is increased, and segregation of the HBI in an upper portion of the experimental layer 84 is remarkable.

Open Porosity of Iron Ore Pellet

An effect on reducibility of open porosity of the iron ore pellet contained as the iron ore material was studied by conducting a large-scale reduction under load test simulating the peripheral portion of the blast furnace.

The furnace for a large-scale reduction under load test 7 illustrated in FIG. 8 was used. A graphite crucible 71 to be filled with a sample was configured to have an inner diameter of 85 mm. A sample filler layer 72 was constituted of, from the top, an upper coke layer 72a (20 mm in height), an iron ore layer 72b (150 mm in height), and a lower coke layer 72c (40 mm in height). The iron ore layer 72b was configured with a mixture of the sintered iron ore (16 to 19 mm in grain size), the iron ore pellet (11.2 to 13.2 mm in grain size), and iron blocks simulating the HBI (30 mm cuboidal×2).

Figure 18:
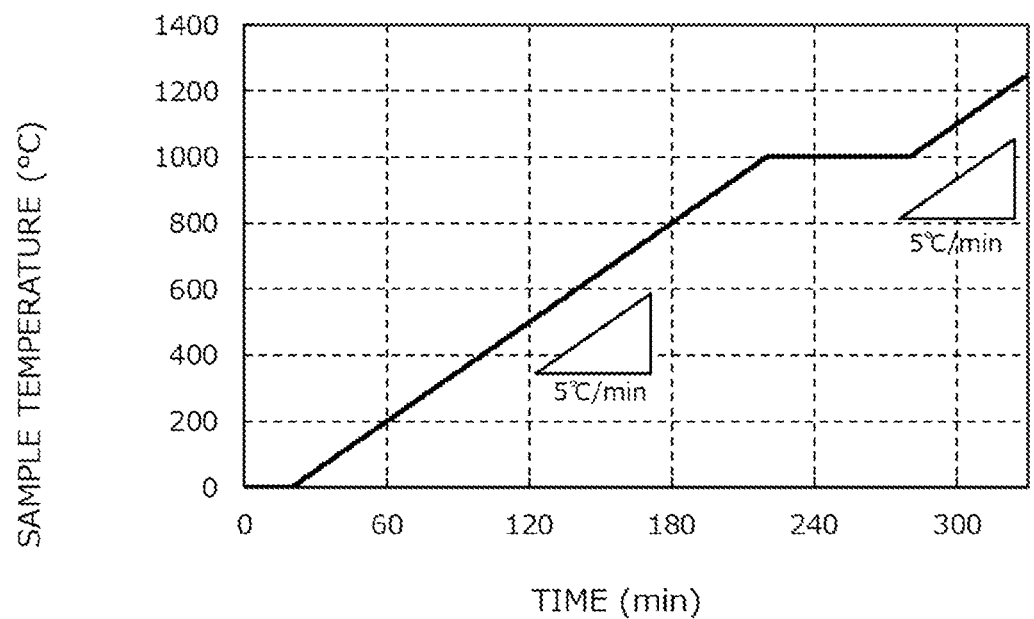
FIG. 18 is a graph showing a temperature profile of heating a sample filler layer in Example studying the reduction percentage.
Figure 19:
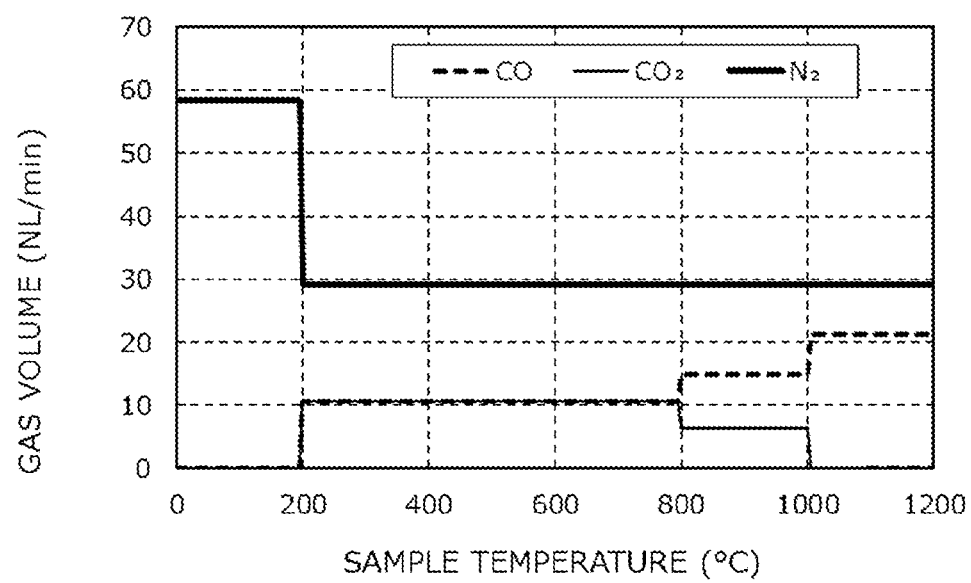
FIG. 19 is a graph showing a relationship between the temperature of the sample filler layer and a gas flow rate to be supplied in Example studying the reduction percentage.

While heating the sample filler layer 72 with a temperature profile shown in FIG. 18 by using an electric furnace 73, gas (reducing gas) of a composition shown in FIG. 19 was supplied thereto. The gas was supplied from a gas supply pipe 74 provided in a lower portion of the furnace for a large-scale reduction under load test 7, and discharged from a gas discharge pipe 75 provided in an upper portion. A total feed rate of the gas was 58.4 NL/min when the sample temperature was less than or equal to 200° C., and 50.4 NL/min when the sample temperature was 200° C. to 1,250° C., where temperature control was carried out by two thermocouples 76. In addition, a load applied to the sample filler layer 72 was 1 kgf/cm². The load was applied by applying a weight of a weight 78 via a load rod 77.

Under the aforementioned conditions, temperature-rising and gas supply were stopped when the temperature of the sample filler layer 72 reached 1,250° C., and the reduction percentage was calculated from a difference between the pre-reduction weight and the post-reduction weight of the sample filler layer 72.

Figure 20:
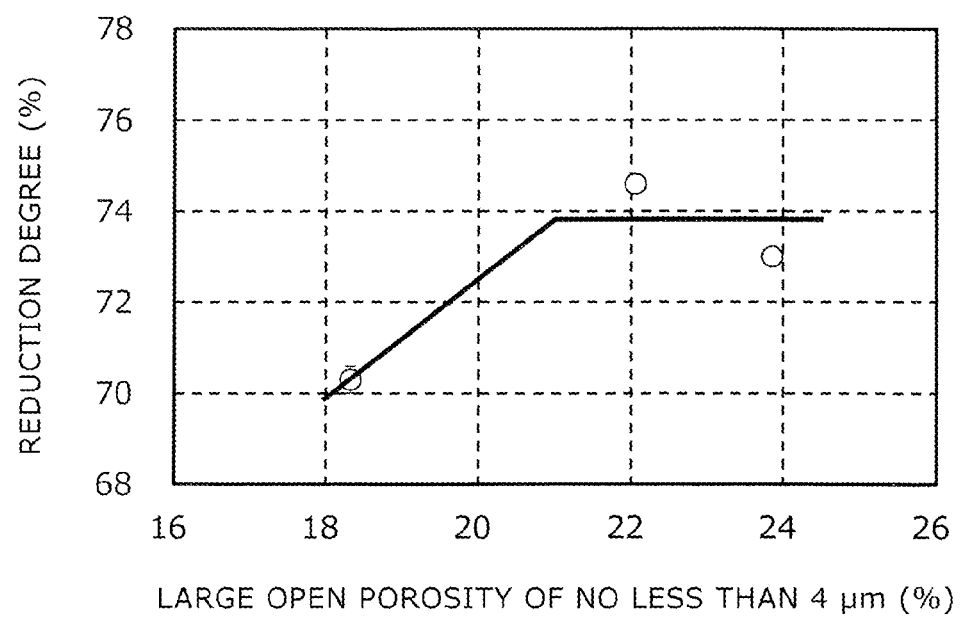
FIG. 20 is a graph showing a relationship between the porosity resulting from the large open pores having the pore size of greater than or equal to 4 μm and the reduction percentage in Example.

The measurement of the reduction percentage was carried out by using three types of iron ore pellet with different open porosities. The measurement was carried out twice only for the iron ore pellet with the lowest open porosity, and once for the other two types of iron ore pellet. The results are shown in FIG. 20. The graph in FIG. 20 shows results of the two measurements with a bar, and an average value thereof with a dot. The results in FIG. 20 indicate that using the iron ore pellet of which the porosity resulting from the large open pores having the pore size of greater than or equal to 4 μm is greater than or equal to 21%, increases the reducibility.

HBI Content in Central Layer

An effect of the central layer on gas permeability was studied by conducting a large-scale reduction under load test simulating the central portion of the blast furnace.

In the furnace for a large-scale reduction under load test 7 in FIG. 8, the sample filler layer 72 was composed of a mixed layer (150 mm in height) of the HBI having chemical characteristics shown in Table 1 (11.2 to 13.2 mm in grain size) and the coke (10.0 to 13.2 mm in grain size), and the maximum pressure loss was measured with different contents of the HBI. Note that the rate of temperature rise was constant at 5° C./min, the gas composition was $CO/N_2$=50/50% by volume, and the total feed rate of the gas was 40 NL/min. The other conditions were the same as those in the above-described Example related to the grain size ratio. The results are shown in FIG. 21.

Figure 21:
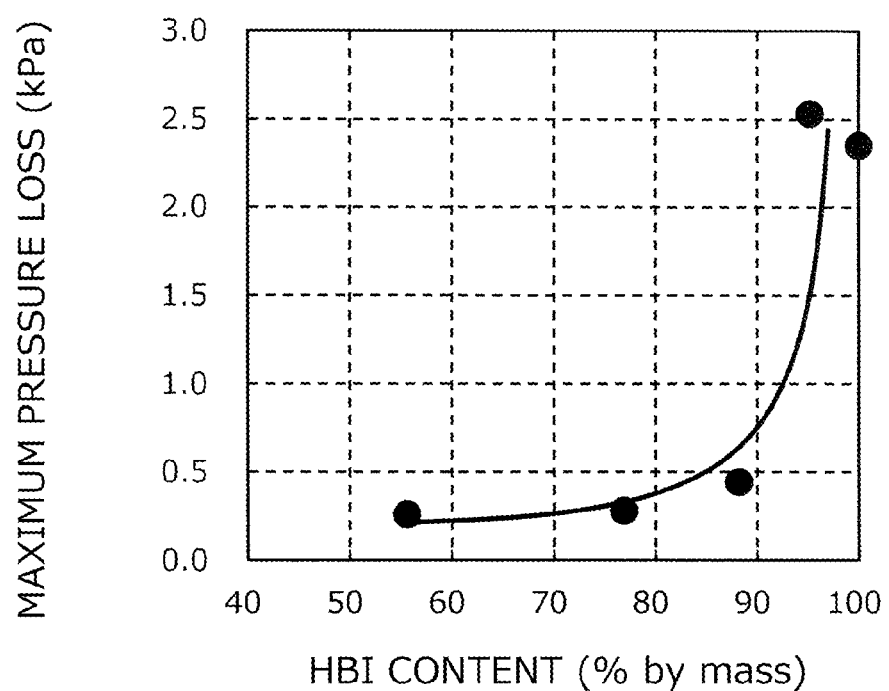
FIG. 21 is a graph showing a relationship between a content of HBI in a central layer and the maximum pressure loss in Example.

The results shown in FIG. 21 indicate that the content of the HBI in the central layer being less than or equal to 75% by mass does not deteriorate the gas permeability. On the other hand, the content of the HBI in the central layer being greater than 75% by mass increases the maximum pressure loss and deteriorates the gas permeability.

Addition of Fine Powder to Auxiliary Reductant

An effect of addition of the fine powder, which is obtained by finely pulverizing powder derived from the reduced iron molded product together with coal, to the auxiliary reductant was verified by simulation.

In the simulation, an average grain size of the powder derived from the reduced iron molded product was fixed to 50 μm, and an injected amount of the pulverized coal included in the fine powder was fixed to 226 kg per 1 ton of pig iron. Under these conditions, a dissolution rate of the fine powder, slug viscosity, drip linear velocity, and a hold-up amount were calculated by well-known methods with different injected amounts of the finely pulverized HBI, and a pressure loss change amount was calculated from these results.

Figure 22:
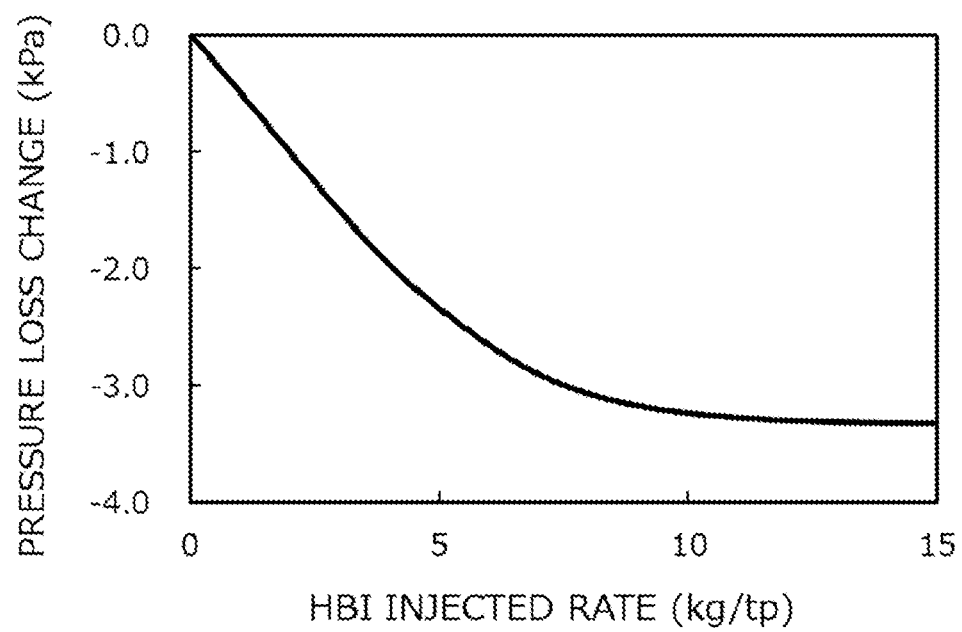
FIG. 22 is a graph showing a relationship between an HBI injected amount and a pressure loss change amount in Example.

The results shown in FIG. 22 indicate that even a small amount of the finely pulverized HBI being included decreases the pressure loss of the furnace lower portion. In addition, it is indicated that the injected amount of the HBI included in the fine powder being greater than or equal to 3 kg per 1 ton of pig iron remarkably improves gas permeability.

INDUSTRIAL APPLICABILITY

The production method of pig iron according to the present invention enables a decrease in the amount of the coke used while maintaining stable operation of the blast furnace.

EXPLANATION OF THE REFERENCE SYMBOLS

1 Blast furnace
1a Tuyere
1b Taphole
1c Auxiliary reductant injection lance
2 Raw material charging device 2a Bell cup
2b Lower bell
2c Armor
10 First layer
11 Iron ore material
12 Aggregate
13 Drip slag
20 Second layer
21 Coke
30 Central layer
31 Coke
32 Reduced iron molded product
41 Fine powder
41a Pulverized reduced iron
41b Pulverized coal
7 Furnace for large-scale reduction under load test
71 Graphite crucible
72 Sample filler layer
72a Upper coke layer
72b Iron ore layer
72c Lower coke layer
73 Electric furnace
74 Gas supply pipe
75 Gas discharge pipe
76 Thermocouple
77 Load rod
78 Weight
8 Blast furnace burden distribution experiment device
8a Center charging chute
81 Coke layer
82 Central coke layer
83 Iron ore layer
84 Experimental layer
A Raceway
B Deadman
C Dripping zone
D Cohesive zone
E Lumpy zone
F Molten iron
G Molten slag
H Hot air
J Bird's nest slag

The invention claimed is:

1. A production method of pig iron using a blast furnace with a tuyere, the production method comprising:
charging a first layer containing an iron ore material and a second layer containing coke alternately in the blast furnace; and
reducing and melting the iron ore material in the charged first layer while injecting an auxiliary reductant into the blast furnace by hot air blown from the tuyere,
wherein:
an aggregate for letting through the hot air to a central portion of the blast furnace is blended into the first layer;
the aggregate contains a reduced iron molded product obtained through compression molding of reduced iron;
a charged rate of the reduced iron molded product is greater than or equal to 100 kg per 1 ton of the pig iron,
a ratio of an average grain size of the reduced iron molded product to an average grain size of the iron ore material is greater than or equal to 1.3; and
a gas permeability resistance index of the reduced iron molded product after a tumbler rotation test is less than or equal to 0.1.

2. A production method of pig iron using a blast furnace with a tuyere, the production method comprising:
charging a first layer containing an iron ore material and a second layer containing coke alternately in the blast furnace; and
reducing and melting the iron ore material in the charged first layer while injecting an auxiliary reductant into the blast furnace by hot air blown from the tuyere,
wherein:
an aggregate for letting through the hot air to a central portion of the blast furnace is blended into the first layer;
the aggregate contains a reduced iron molded product obtained through compression molding of reduced iron; and
basicity of the reduced iron molded product is greater than or equal to 0.9 and less than or equal to 1.4.

3. A production method of pig iron using a blast furnace with a tuyere, the production method comprising:
charging a first layer containing an iron ore material and a second layer containing coke alternately in the blast furnace; and
reducing and melting the iron ore material in the charged first layer while injecting an auxiliary reductant into the blast furnace by hot air blown from the tuyere,
wherein:
an aggregate for letting through the hot air to a central portion of the blast furnace is blended into the first layer;
the aggregate contains a reduced iron molded product obtained through compression molding of reduced iron;
the reduced iron molded product contains aluminum oxide; and
a content of the aluminum oxide in the reduced iron molded product is less than or equal to 1.5% by mass.

4. A production method of pig iron using a blast furnace with a tuyere, the production method comprising:
charging a first layer containing an iron ore material and a second layer containing coke alternately in the blast furnace; and
reducing and melting the iron ore material in the charged first layer while injecting an auxiliary reductant into the blast furnace by hot air blown from the tuyere,
wherein:
an aggregate for letting through the hot air to a central portion of the blast furnace is blended into the first layer;
the aggregate contains a reduced iron molded product obtained through compression molding of reduced iron; and
the iron ore material contains iron ore pellet, of which a porosity resulting from large open pores having a pore size of greater than or equal to 4 µm is greater than or equal to 21%, and a crushing strength is greater than or equal to 180 kg/P.

5. A production method of pig iron using a blast furnace with a tuyere, the production method comprising:
charging a first layer containing an iron ore material and a second layer containing coke alternately in the blast furnace;
charging a mixture of the coke and the reduced iron molded product to a central portion of the blast furnace; and
reducing and melting the iron ore material in the charged first layer while injecting an auxiliary reductant into the blast furnace by hot air blown from the tuyere, wherein:

an aggregate for letting through the hot air to a central portion of the blast furnace is blended into the first layer;

the aggregate contains a reduced iron molded product obtained through compression molding of reduced iron;

in the reduced iron molded product in the mixture, a proportion of the reduced iron molded product having a grain size of greater than or equal to 5 mm is greater than or equal to 90% by mass; and a content of the reduced iron molded product in the mixture is less than or equal to 75% by mass.

6. A production method of pig iron using a blast furnace with a tuyere, the production method comprising:

charging a first layer containing an iron ore material and a second layer containing coke alternately in the blast furnace;

reducing and melting the iron ore material in the charged first layer while injecting an auxiliary reductant into the blast furnace by hot air blown from the tuyere; and finely pulverizing powder derived from the reduced iron molded product and coal, wherein an aggregate for letting through the hot air to a central portion of the blast furnace is blended into the first layer;

the aggregate contains a reduced iron molded product obtained through compression molding of reduced iron;

a grain size of the reduced iron molded product to be pulverized in the pulverizing is less than or equal to 3 mm;

an average grain size of the reduced iron molded product after the pulverizing is less than or equal to 100 µm; and fine powder obtained by the pulverizing is comprised as the auxiliary reductant.

* * * * *